US012149037B2

(12) United States Patent
Sato

(10) Patent No.: US 12,149,037 B2
(45) Date of Patent: Nov. 19, 2024

(54) ELECTRIC WIRE MANUFACTURING METHOD AND ELECTRIC WIRE MANUFACTURING APPARATUS

(71) Applicant: Yazaki Corporation, Tokyo (JP)

(72) Inventor: Kei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 702 days.

(21) Appl. No.: 17/380,102

(22) Filed: Jul. 20, 2021

(65) Prior Publication Data

US 2022/0029370 A1 Jan. 27, 2022

(30) Foreign Application Priority Data

Jul. 22, 2020 (JP) ................................. 2020-124831

(51) Int. Cl.
*H01R 43/02* (2006.01)
*H01R 43/048* (2006.01)

(52) U.S. Cl.
CPC ..... *H01R 43/0221* (2013.01); *H01R 43/0263* (2013.01); *H01R 43/048* (2013.01)

(58) Field of Classification Search
CPC ............ H01R 43/0221; H01R 43/0263; H01R 43/048
USPC ..................................................... 219/121.64
See application file for complete search history.

(56) References Cited

U.S. PATENT DOCUMENTS

| | | | | | |
|---|---|---|---|---|---|
| 3,020,333 | A * | 2/1962 | Bangert | H01R 4/16 | 228/136 |
| 3,417,195 | A * | 12/1968 | Shlesinger, Jr. | H01R 4/58 | 174/DIG. 7 |
| 3,524,963 | A * | 8/1970 | Swengel | B23K 9/0671 | 219/100 |
| 3,656,092 | A * | 4/1972 | Swengel, Sr. | H01R 4/723 | 439/730 |
| 3,665,367 | A * | 5/1972 | Keller | B23K 1/0056 | 439/866 |
| 4,129,744 | A * | 12/1978 | Cunningham | H01R 4/625 | 174/94 R |
| 4,341,942 | A * | 7/1982 | Chaudhari | H01L 24/48 | 219/121.64 |
| 4,583,065 | A * | 4/1986 | Favre-Tissot | H01R 43/02 | 335/106 |

(Continued)

FOREIGN PATENT DOCUMENTS

| | | | | |
|---|---|---|---|---|
| JP | 2013186949 A * | 9/2013 | | H01R 4/62 |
| JP | 2013-222625 A | 10/2013 | | |

(Continued)

*Primary Examiner* — Jimmy Chou
(74) *Attorney, Agent, or Firm* — Sughrue Mion, PLLC

(57) ABSTRACT

An electric wire manufacturing method includes: a step of placing a core wire including a plurality of strands inside a tubular jig; and a step of forming a joined portion that integrates the strands by emitting laser light along an axial direction of the core wire toward a tip of the core wire placed inside the jig. In the placing step, the core wire is placed with a gap between an inner wall surface of the jig and an outer circumferential surface of the core wire while the tip of the core wire faces upward relative to a horizontal line. In the step of forming the joined portion, the joined portion is formed by filling the gap with a melted substance of the strands.

16 Claims, 25 Drawing Sheets

(56) References Cited

U.S. PATENT DOCUMENTS

| | | | | | |
|---|---|---|---|---|---|
| 4,774,394 | A * | 9/1988 | Lemke | B23K 26/22 | 219/121.64 |
| 4,966,565 | A * | 10/1990 | Dohi | H01R 4/187 | 29/860 |
| 5,300,755 | A * | 4/1994 | Nishitani | H01R 43/0228 | 219/121.64 |
| 5,541,365 | A * | 7/1996 | Sugiura | H01R 4/02 | 219/121.64 |
| 5,877,472 | A * | 3/1999 | Campbell | H01R 4/029 | 219/121.64 |
| 5,935,463 | A * | 8/1999 | Sugiura | B23K 26/20 | 219/121.64 |
| 6,061,595 | A * | 5/2000 | Safarevich | H01R 43/0221 | 439/874 |
| 6,465,758 | B1 * | 10/2002 | Ham | A61B 17/82 | 219/121.65 |
| 6,531,676 | B2 * | 3/2003 | Schwemmer | H01R 43/0221 | 219/121.64 |
| 7,128,620 | B2 * | 10/2006 | Maura | H01R 43/0221 | 219/121.64 |
| 7,628,647 | B2 * | 12/2009 | Semba | H01R 12/598 | 439/579 |
| 7,705,265 | B2 * | 4/2010 | Asakura | H01R 43/0221 | 228/136 |
| 7,770,290 | B2 * | 8/2010 | Nakamae | H01R 12/598 | 29/857 |
| 8,283,592 | B2 * | 10/2012 | Nakamae | B23K 26/009 | 219/121.64 |
| 8,704,123 | B2 * | 4/2014 | Rosenkranz | B23K 33/00 | 228/136 |
| 8,759,679 | B2 * | 6/2014 | Yoshida | H01R 43/0221 | 174/94 R |
| 8,826,525 | B2 * | 9/2014 | Vaccaro | B23K 26/32 | 219/121.64 |
| 8,919,633 | B2 * | 12/2014 | Cui | F01D 11/001 | 219/121.64 |
| 9,011,188 | B2 * | 4/2015 | Aoki | H01R 43/0207 | 439/874 |
| 9,601,889 | B2 * | 3/2017 | Ito | H01R 4/22 | |
| 9,647,348 | B2 * | 5/2017 | Trafton | H01B 7/2806 | |
| 9,728,927 | B2 * | 8/2017 | Kovacs | B23K 26/32 | |
| 10,193,241 | B2 * | 1/2019 | Yoshida | B23K 26/389 | |
| 10,263,347 | B2 * | 4/2019 | Koto | H01R 4/723 | |
| 10,283,924 | B2 * | 5/2019 | Bauer | H01R 4/187 | |
| 10,328,512 | B2 * | 6/2019 | Steinberg | B23K 10/02 | |
| 10,643,915 | B2 * | 5/2020 | Akimoto | H01L 23/3114 | |
| 10,651,611 | B2 * | 5/2020 | Okada | H01R 43/048 | |
| 10,680,350 | B2 * | 6/2020 | Sachs | H01R 43/0263 | |
| 10,833,426 | B2 * | 11/2020 | Hoenle | H01R 4/18 | |
| 11,045,897 | B2 * | 6/2021 | Rinker | B23K 20/10 | |
| 11,133,634 | B2 * | 9/2021 | Takeda | H01R 4/185 | |
| 11,158,961 | B2 * | 10/2021 | Forstmeier | B23K 20/122 | |
| 11,394,163 | B2 * | 7/2022 | Goetzmann | H01R 43/16 | |
| 11,489,305 | B2 * | 11/2022 | Sato | H01R 4/62 | |
| 12,015,230 | B2 * | 6/2024 | Fröschl | H01R 43/0221 | |
| 2004/0142607 | A1 * | 7/2004 | Asakura | H01R 43/0221 | 439/877 |
| 2007/0114211 | A1 * | 5/2007 | Reynolds | A61M 25/09 | 219/121.13 |
| 2010/0282486 | A1 * | 11/2010 | Shin | H01R 4/72 | 174/85 |
| 2012/0074111 | A1 * | 3/2012 | Sasabe | C22C 21/02 | 219/137 R |
| 2012/0237787 | A1 * | 9/2012 | Yoshida | H01R 43/0221 | 428/615 |
| 2012/0329343 | A1 * | 12/2012 | Sato | H01R 13/52 | 439/866 |
| 2014/0106628 | A1 * | 4/2014 | Sato | H01R 4/206 | 439/877 |
| 2014/0144016 | A1 * | 5/2014 | Bauer | B23K 26/21 | 29/863 |
| 2014/0165393 | A1 * | 6/2014 | Sato | H01R 4/70 | 29/858 |
| 2014/0182127 | A1 * | 7/2014 | Kovacs | H01R 13/65912 | 219/121.64 |
| 2015/0140856 | A1 * | 5/2015 | Sato | H01R 4/70 | 439/523 |
| 2015/0287496 | A1 * | 10/2015 | Sato | H01R 4/70 | 29/867 |
| 2015/0325930 | A1 * | 11/2015 | Hoenle | H01R 4/20 | 29/882 |
| 2015/0357722 | A1 * | 12/2015 | Sato | H01R 4/185 | 439/877 |
| 2015/0357725 | A1 * | 12/2015 | Matsuo | H01R 43/02 | 439/877 |
| 2016/0261054 | A1 * | 9/2016 | Sato | H01R 4/70 | |
| 2016/0276777 | A1 * | 9/2016 | Sato | H01R 4/70 | |
| 2016/0372841 | A1 * | 12/2016 | Sato | H01R 13/521 | |
| 2016/0372881 | A1 * | 12/2016 | Bauer | B23K 26/20 | |
| 2017/0110805 | A1 * | 4/2017 | Yoshida | B23K 1/0056 | |
| 2018/0348442 | A1 * | 12/2018 | Hikosaka | G02B 6/3855 | |
| 2021/0296839 | A1 * | 9/2021 | Kondo | H01R 43/28 | |
| 2023/0256539 | A1 * | 8/2023 | Yasuoka | B23K 26/21 | 219/121.64 |
| 2023/0311243 | A1 * | 10/2023 | Matsumoto | B23K 26/24 | 219/121.64 |

FOREIGN PATENT DOCUMENTS

| | | | | |
|---|---|---|---|---|
| JP | 5794843 | B2 | 10/2015 | |
| JP | 2015197983 | A * | 11/2015 | |
| JP | 2016001551 | A * | 1/2016 | |
| JP | 5901403 | B2 * | 4/2016 | H01R 43/0221 |

* cited by examiner

ELECTRIC WIRE MANUFACTURING METHOD AND ELECTRIC WIRE MANUFACTURING APPARATUS

CROSS-REFERENCE TO RELATED APPLICATION(S)

The present application claims priority to and incorporates by reference the entire contents of Japanese Patent Application No. 2020-124831 filed in Japan on Jul. 22, 2020.

BACKGROUND OF THE INVENTION

1. Field of the Invention

The present invention relates to an electric wire manufacturing method and an electric wire manufacturing apparatus.

2. Description of the Related Art

A conventional technique is known that melts an electric wire with a laser or the like. Japanese Patent No. 5794843 discloses a method of welding tips of electric wire conductors by radiating a high energy density beam toward the vicinity of the tips of the electric wire conductors to melt the tips of the electric wire conductors, integrating the tips through melting by surface tension of the molten metal, and solidifying the tips.

It is desirable to control the shape of a solidifying melted core wire. For example, solidifying the core wire into a desired shape can reduce variations in performance of the electric wire.

SUMMARY OF THE INVENTION

An object of the present invention is to provide an electric wire manufacturing method and an electric wire manufacturing apparatus that can control the shape of a solidifying melted core wire.

In order to achieve the above mentioned object, an electric wire manufacturing method according to one aspect of the present invention includes placing a core wire inside a jig having a tubular shape, the core wire including a plurality of strands; and forming a joined portion that integrates the strands by emitting laser light toward a tip of the core wire placed inside the jig, the laser light being emitted in an axial direction of the core wire, wherein in the placing, the core wire is placed with a gap between an inner wall surface of the jig and an outer circumferential surface of the core wire while the tip of the core wire faces upward relative to a horizontal line, and in the forming the joined portion, the joined portion is formed by filling the gap with a melted substance of the strands.

According to another aspect of the present invention, in the electric wire manufacturing method, it is preferable that in the placing, the gap is made between the inner wall surface of the jig and the outer circumferential surface of the core wire over an entire circumference of the outer circumferential surface of the core wire.

According to still another aspect of the present invention, in the electric wire manufacturing method, it is preferable that in the placing, a plurality of the core wires are placed inside the jig and the gap is made between the outer circumferential surface of each of the core wires and the inner wall surface of the jig, and in the forming the joined portion, the joined portion that integrates the core wires is formed by emitting laser light toward tips of the core wires.

According to still another aspect of the present invention, it is preferable that the electric wire manufacturing method includes connecting a terminal to the joined portion, wherein in the connecting the terminal, the terminal is crimped to the joined portion or the joined portion is brought into pressure contact with the terminal.

According to still another aspect of the present invention, it is preferable that the electric wire manufacturing method includes joining the joined portion formed in a first electric wire and the joined portion formed in a second electric wire together.

According to still another aspect of the present invention, in the electric wire manufacturing method, it is preferable that the placing and the forming the joined portion use the jig that is transparent and configured to transmit the laser light.

In order to achieve the above mentioned object, an electric wire manufacturing apparatus according to still another aspect of the present invention includes a jig having a tubular shape, the jig being configured to accommodate a core wire including a plurality of strands while a tip of the core wire faces upward relative to a horizontal line; a holding mechanism configured to hold the core wire providing a gap between an inner wall surface of the jig and an outer circumferential surface of the core wire; and an emitting part configured to emit laser light toward the tip of the core wire placed inside the jig to form a joined portion by filling the gap with a melted substance of the strands, the laser light being emitted in an axial direction of the core wire.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An electric wire manufacturing method and an electric wire manufacturing apparatus according to an embodiment of the present invention will be described in detail below with reference to the drawings. Note that the present embodiment should not be construed to limit this invention. Furthermore, constituents of the following embodiment include constituents that can be easily conceived by those skilled in the art or that are substantially the same.

Embodiment

Figure 1:
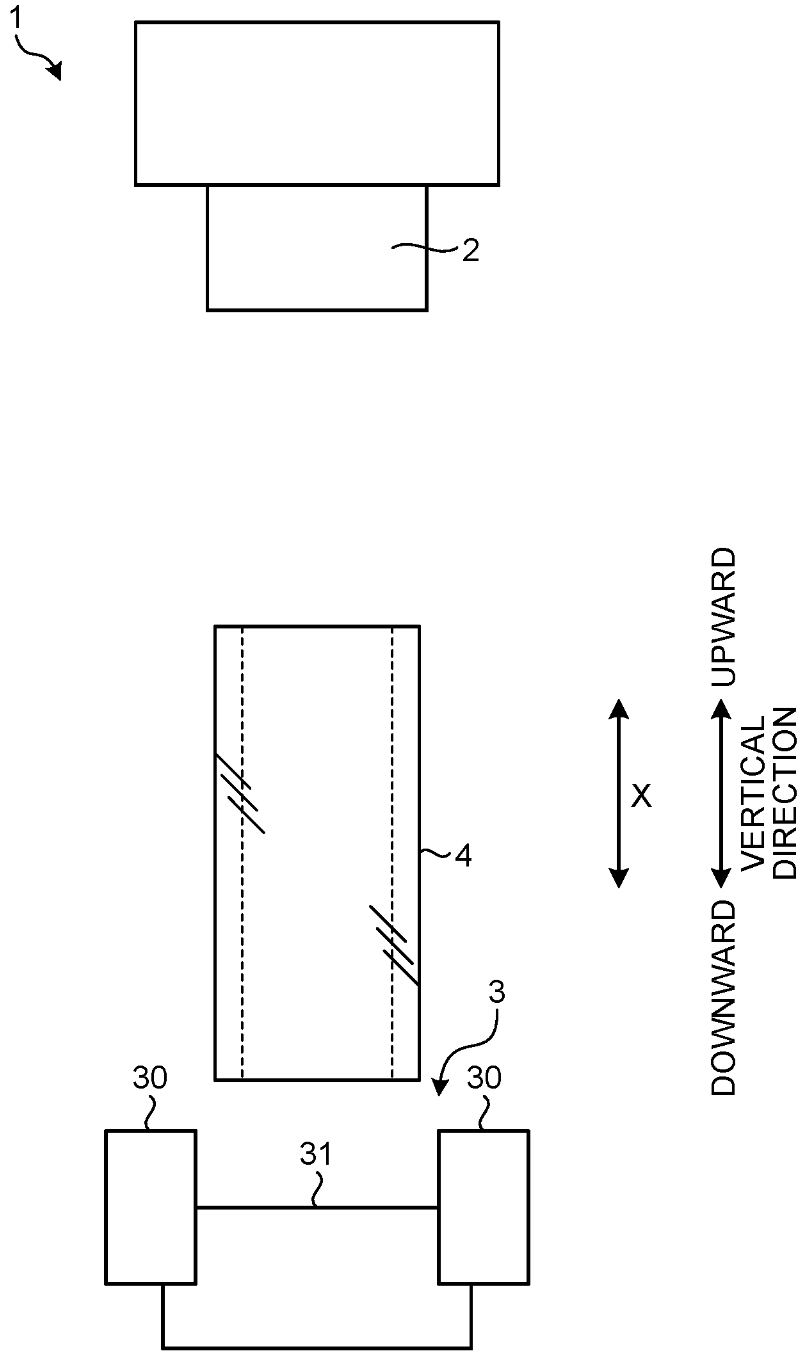
FIG. 1 is a schematic view of a configuration of an electric wire manufacturing apparatus according to an embodiment.
Figure 2:
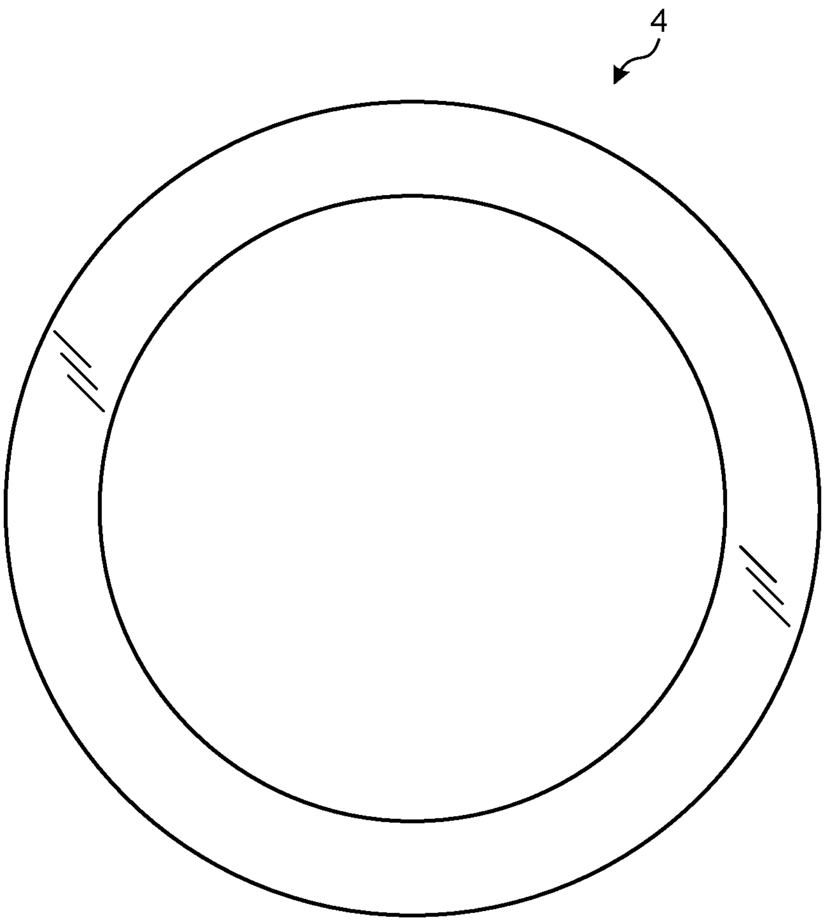
FIG. 2 is a front view of a jig according to the embodiment.
Figure 3:
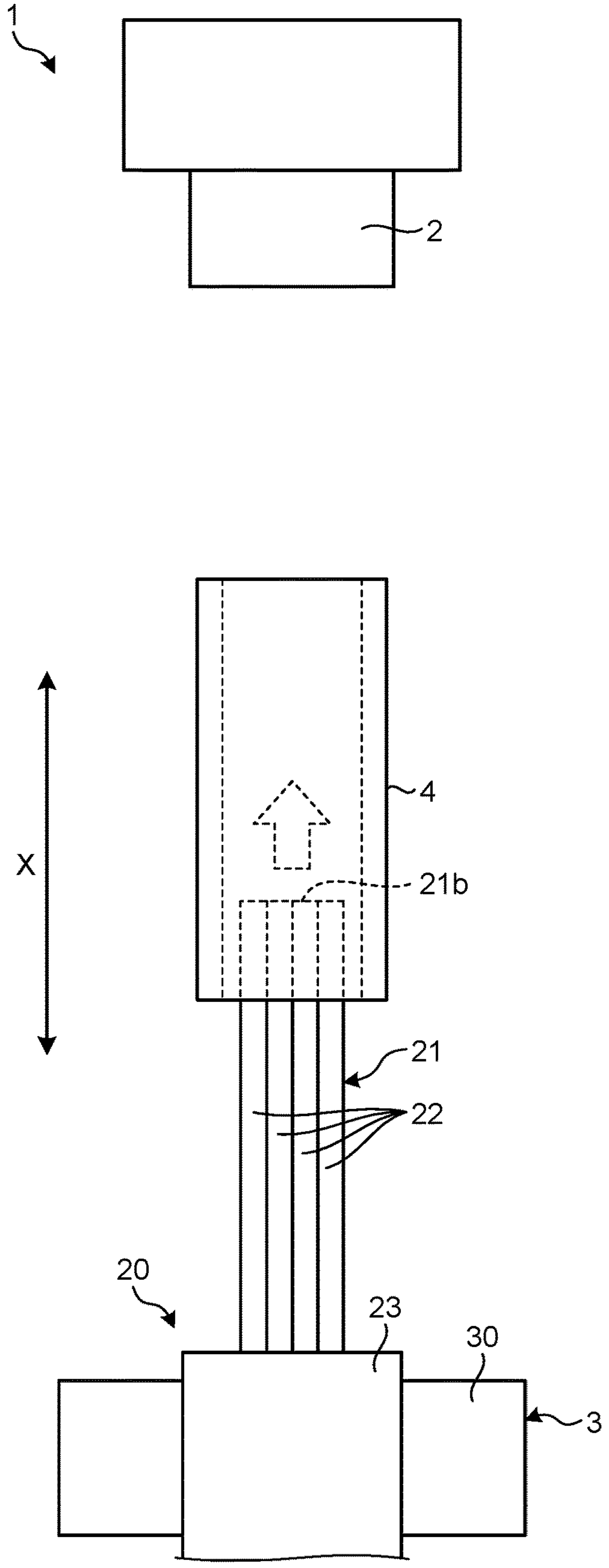
FIG. 3 is a diagram of a step of placing a core wire.
Figure 4:
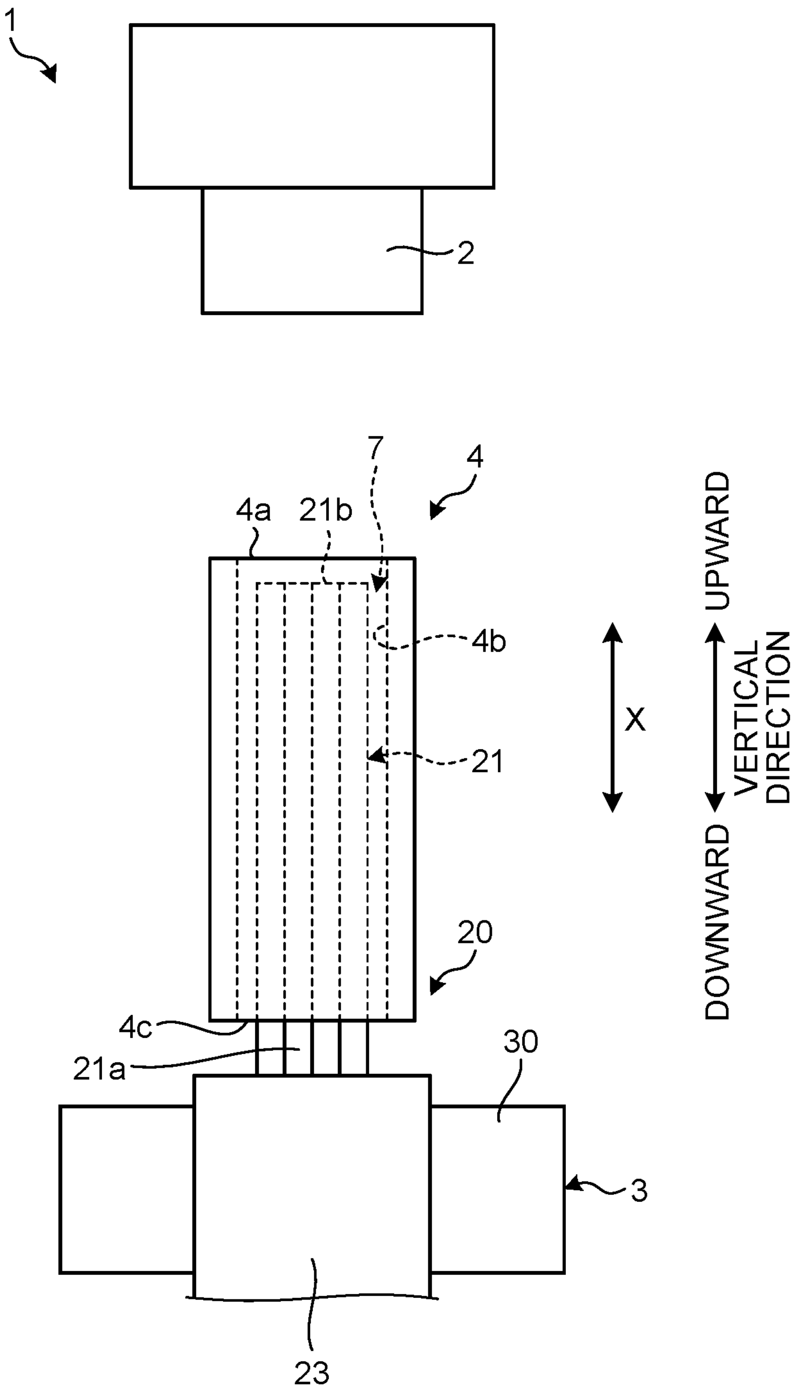
FIG. 4 is a diagram illustrating the core wire placed inside the jig.
Figure 5:
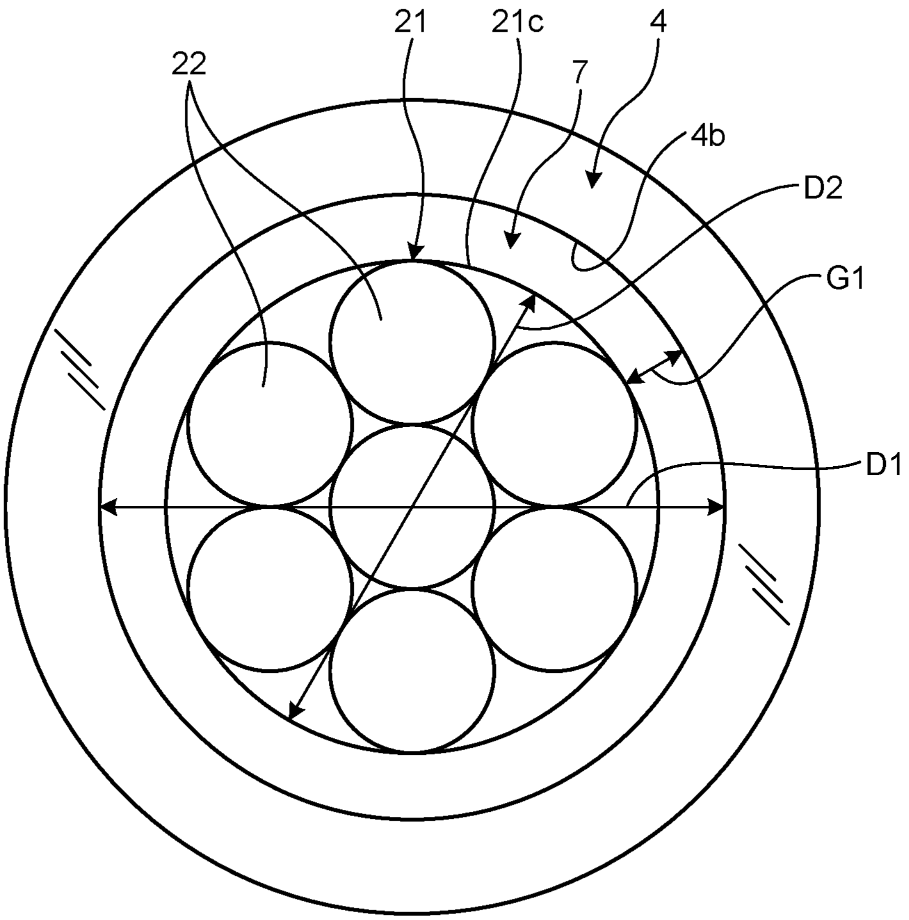
FIG. 5 is a diagram illustrating the core wire placed inside the jig.
Figure 6:
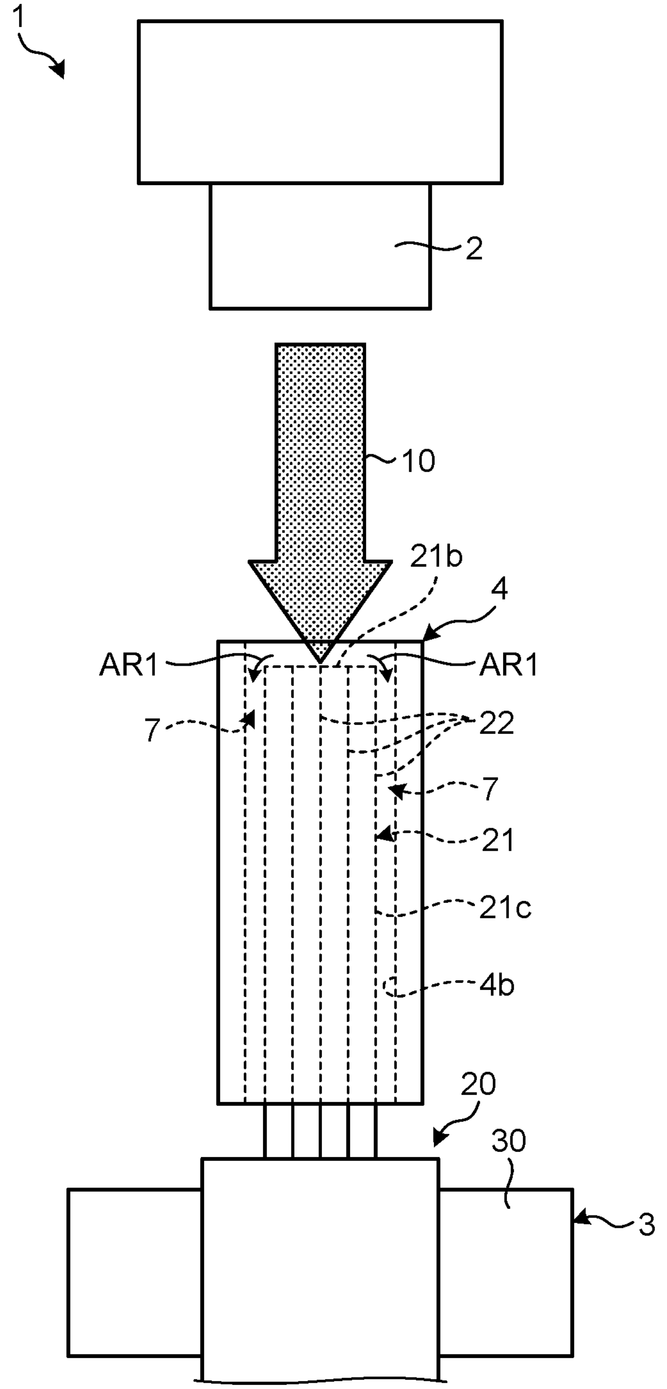
FIG. 6 is an explanatory diagram of a joining step.
Figure 7:
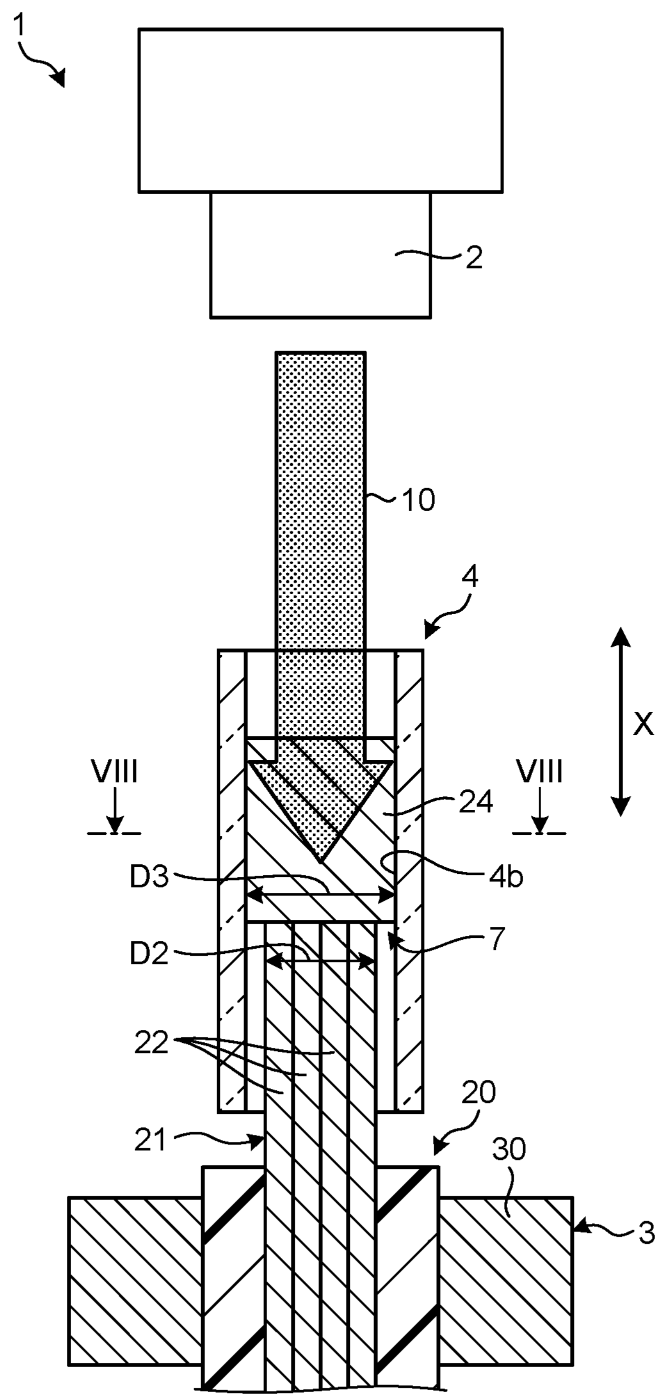
FIG. 7 is a diagram illustrating a formed joined portion.
Figure 8:
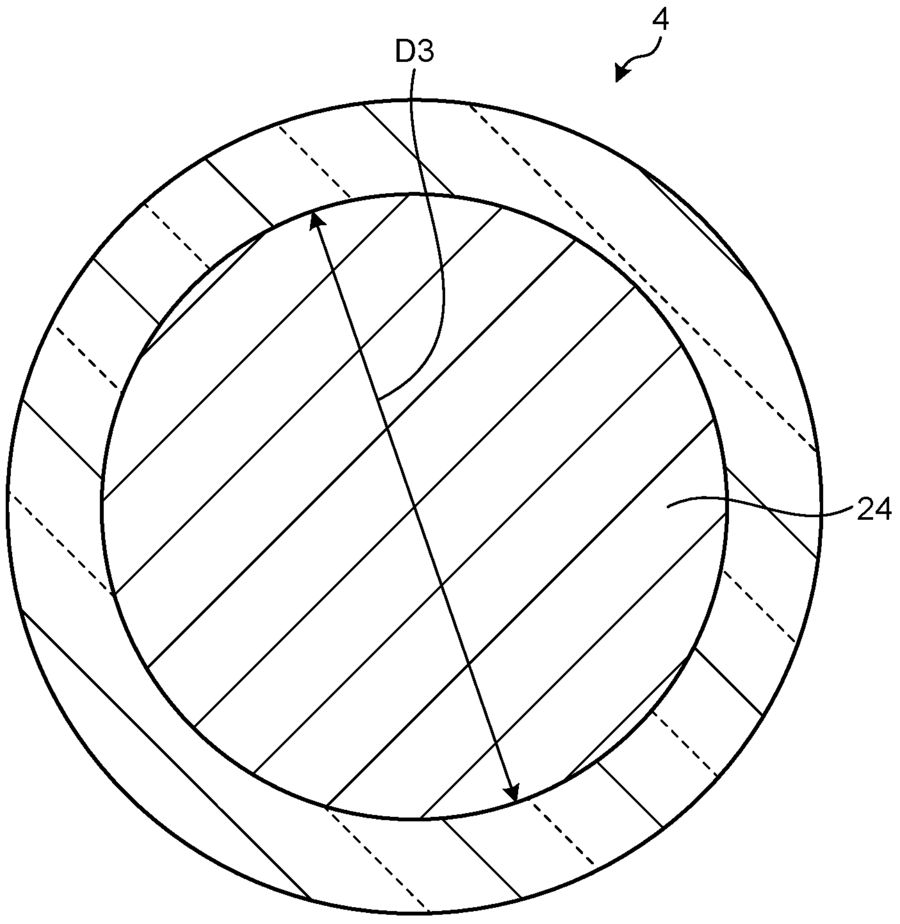
FIG. 8 is a sectional view illustrating the formed joined portion.
Figure 9:
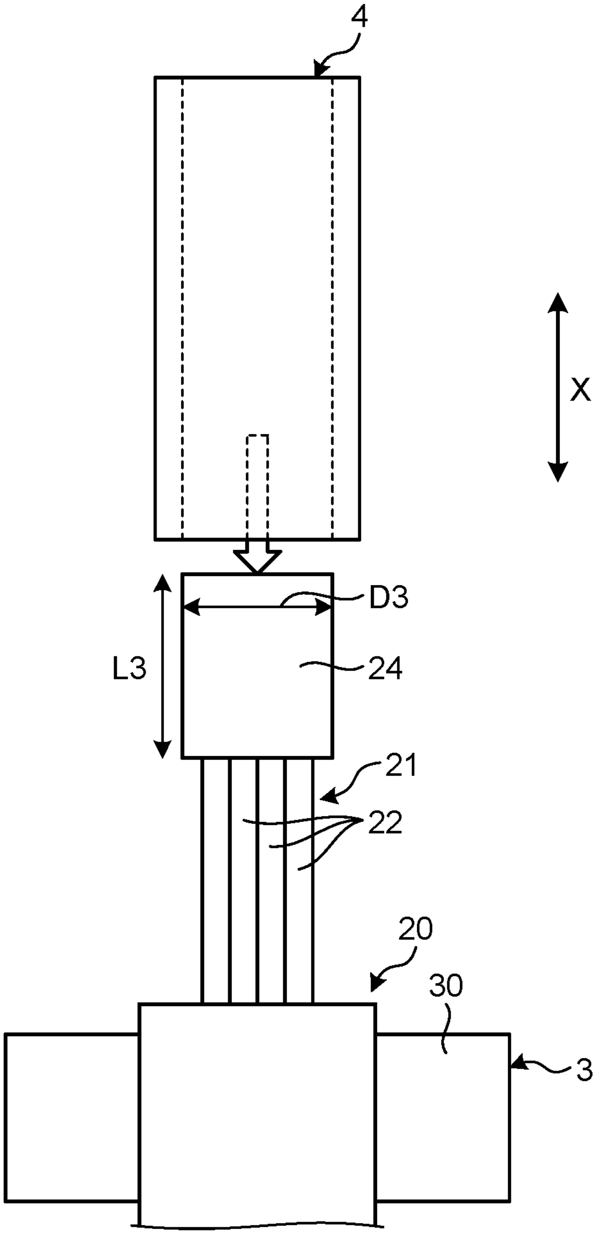
FIG. 9 is a diagram illustrating the joined portion pulled out from the jig.
Figure 10:
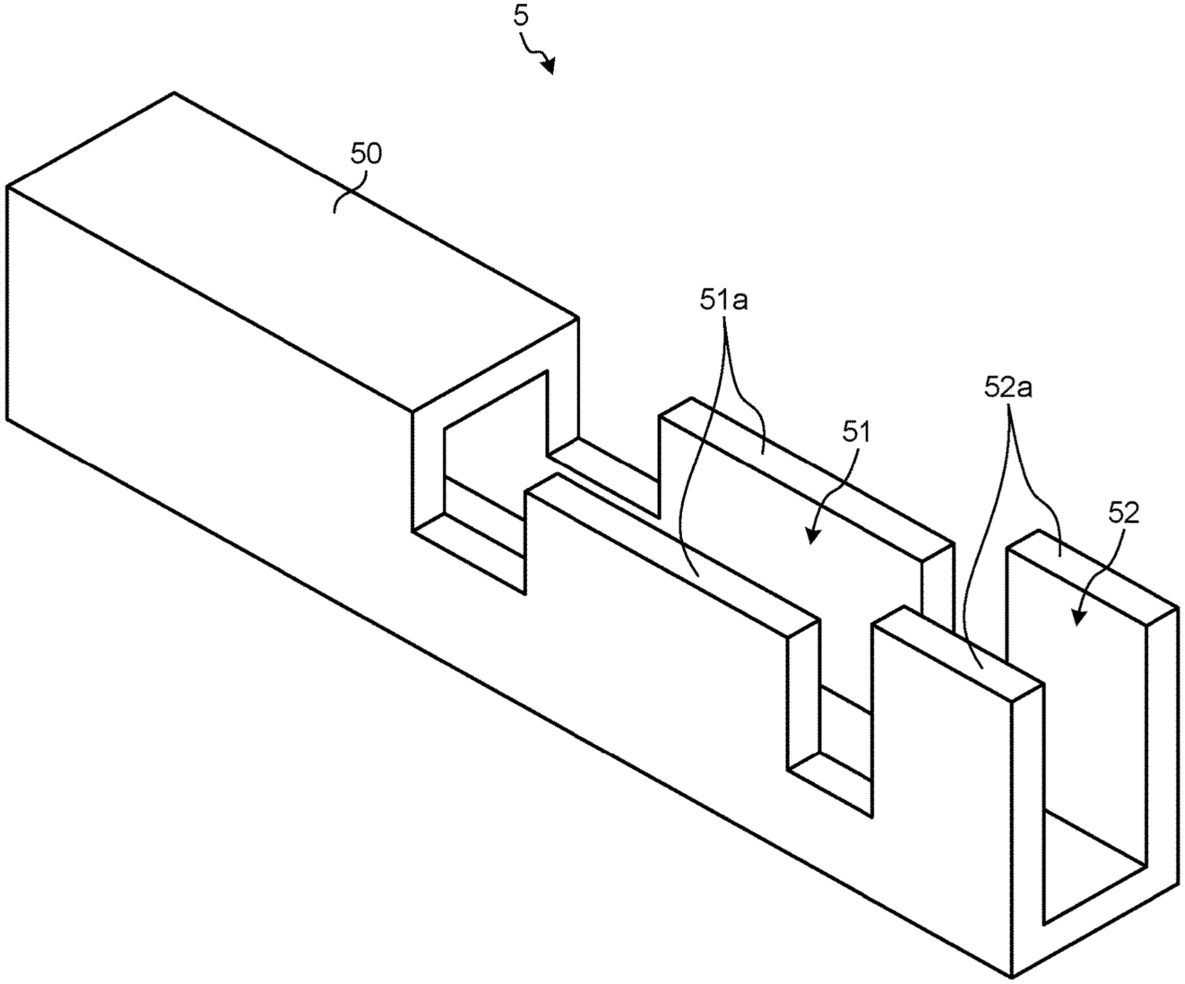
FIG. 10 is a perspective view illustrating an example terminal.

An embodiment will be described with reference to FIGS. 1 to 17. The present embodiment relates to an electric wire manufacturing method and an electric wire manufacturing apparatus. FIG. 1 is a schematic view of a configuration of an electric wire manufacturing apparatus according to the embodiment; FIG. 2 is a front view of a jig according to the embodiment; FIG. 3 is a diagram of a step of placing a core wire; FIG. 4 is a diagram illustrating the core wire placed inside the jig; FIG. 5 is a diagram illustrating the core wire placed inside the jig; FIG. 6 is an explanatory diagram of a joining step; FIG. 7 is a diagram illustrating a formed joined portion; FIG. 8 is a sectional view illustrating the formed joined portion; FIG. 9 is a diagram illustrating the joined portion pulled out from the jig; and FIG. 10 is a perspective view illustrating an example terminal.

Figure 11:
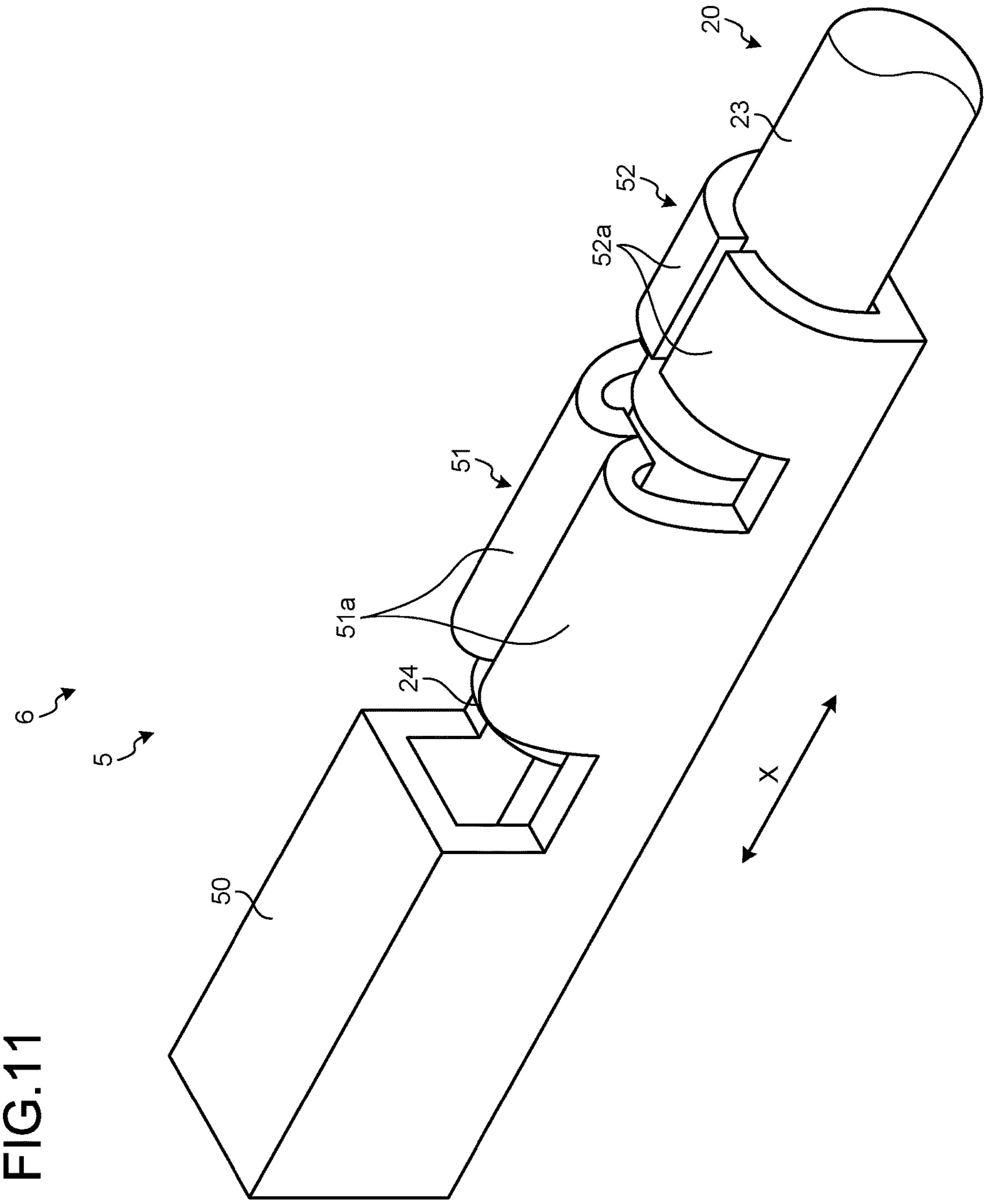
FIG. 11 is a perspective view illustrating the terminal caulked to an electric wire.
Figure 12:
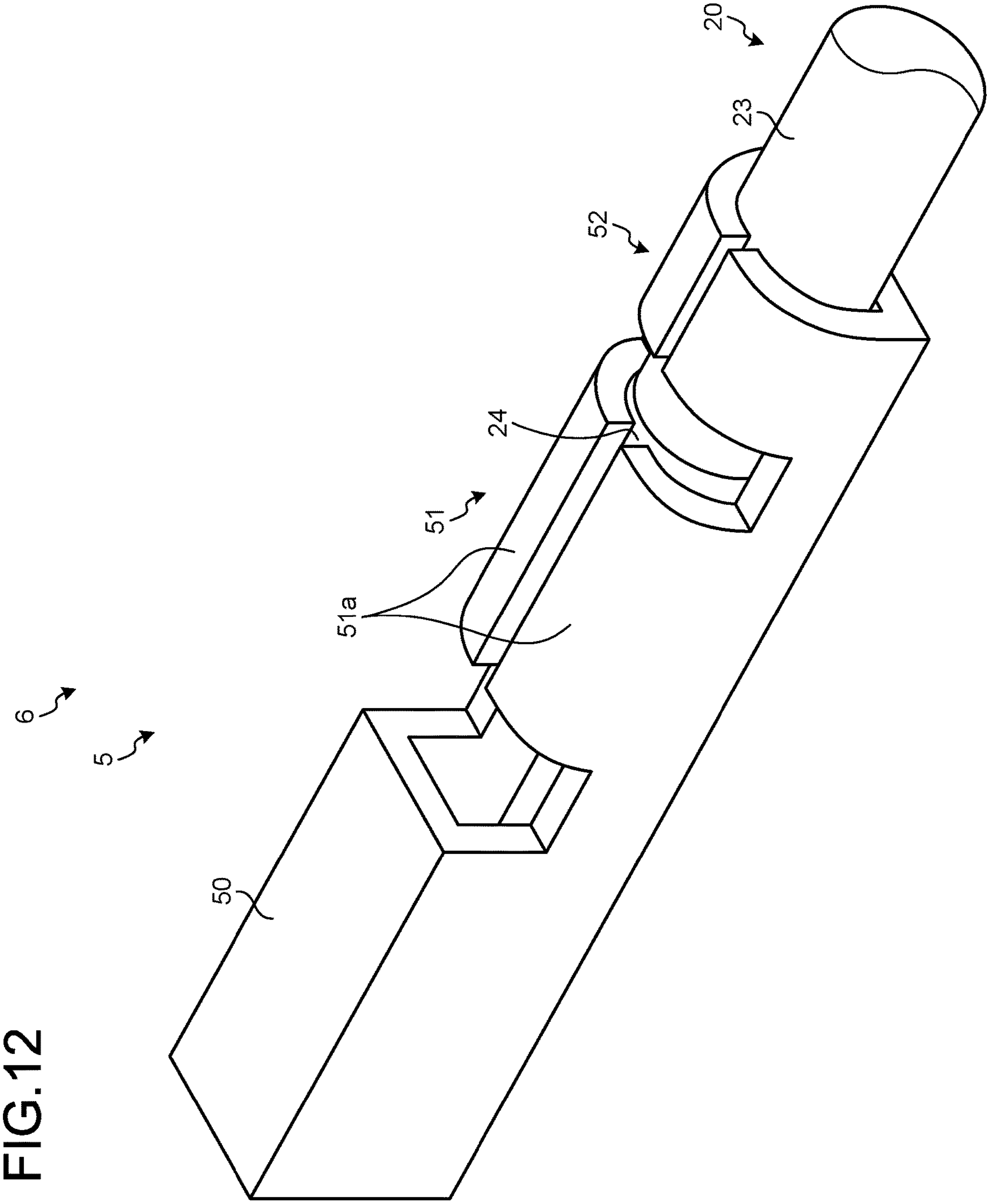
FIG. 12 is a perspective view illustrating the terminal welded to the electric wire.
Figure 13:
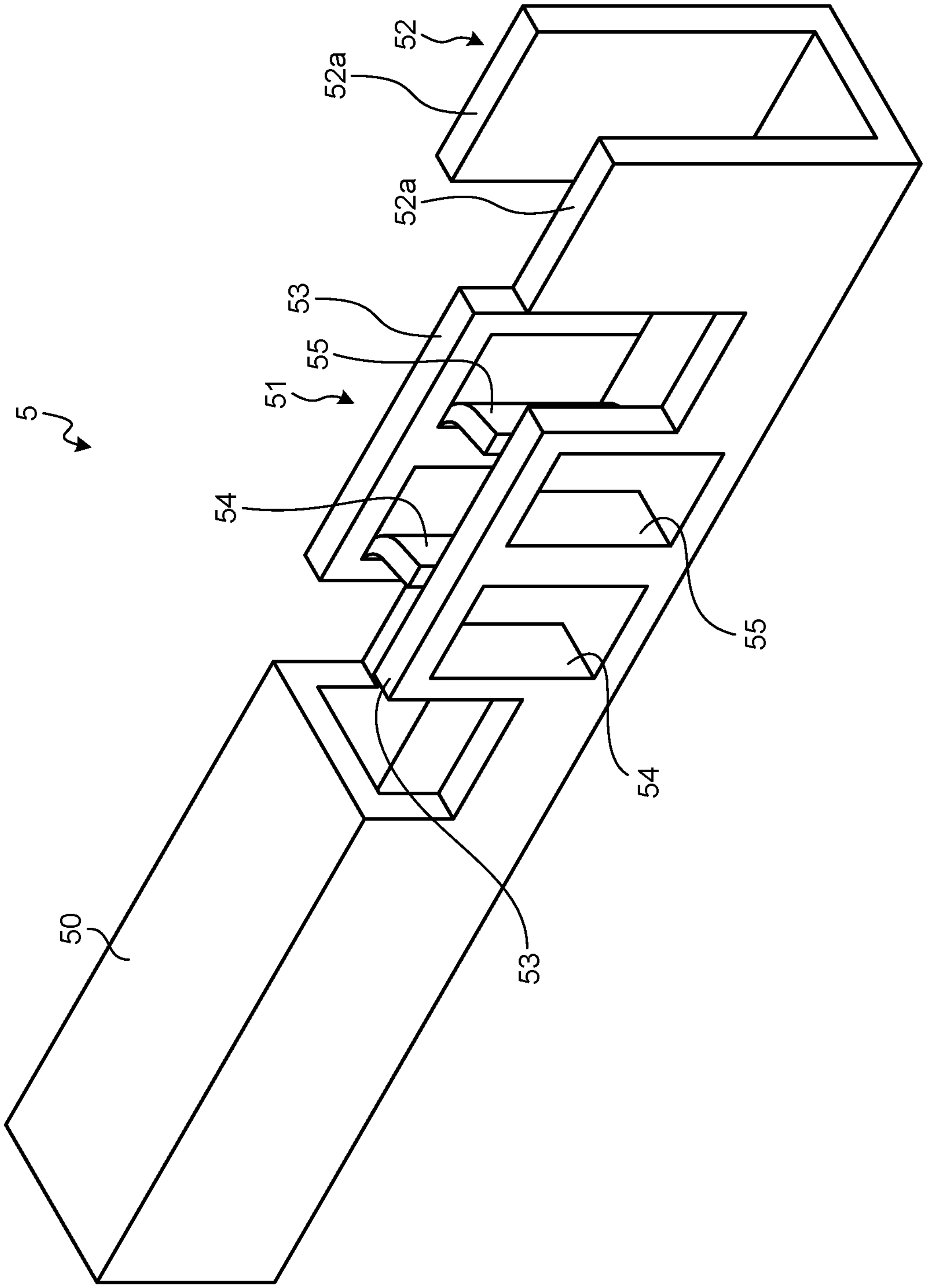
FIG. 13 is a perspective view illustrating an example pressure-contact terminal.
Figure 14:
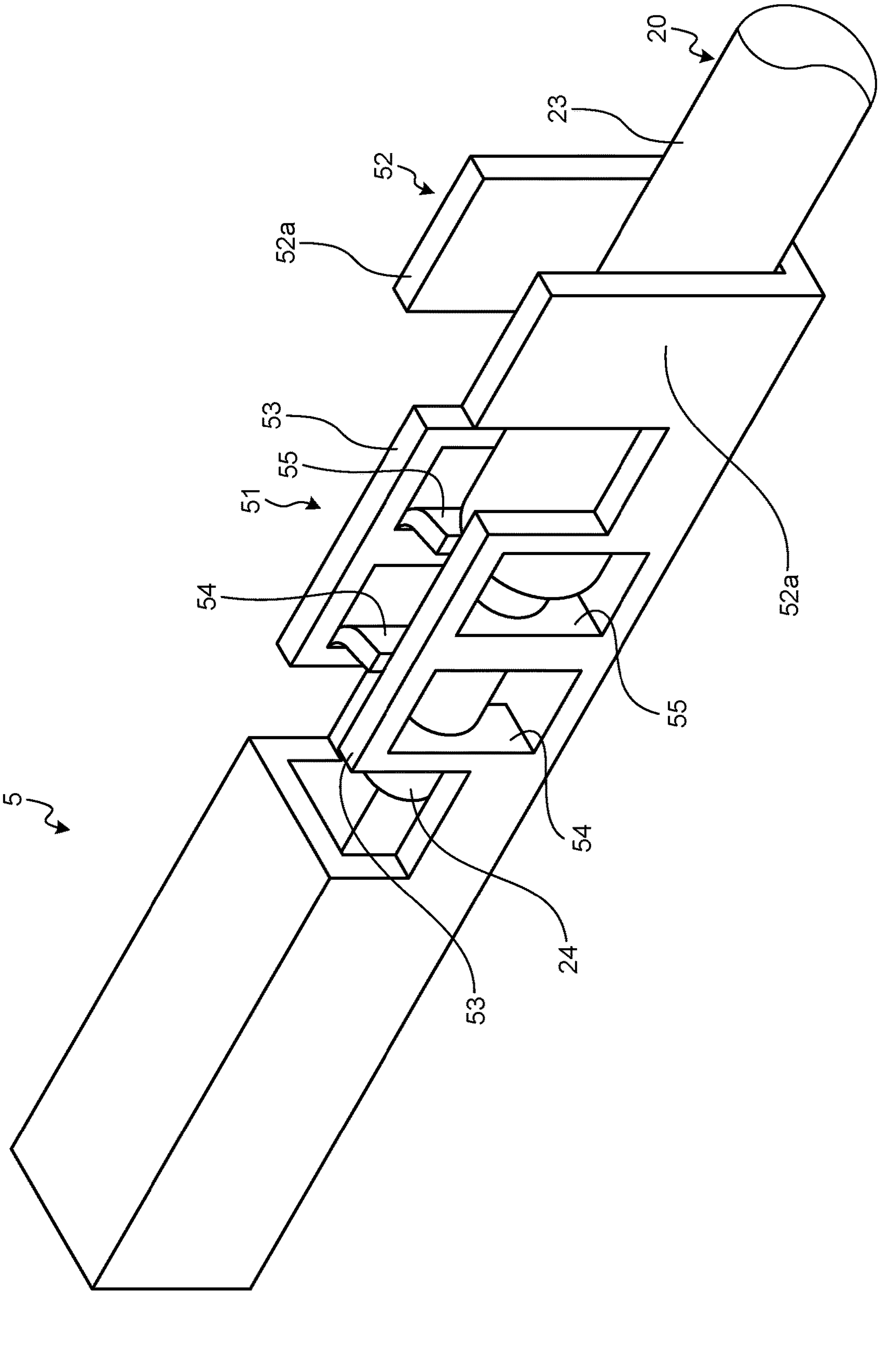
FIG. 14 is a perspective view illustrating the electric wire in pressure contact with the pressure-contact terminal.
Figure 15:
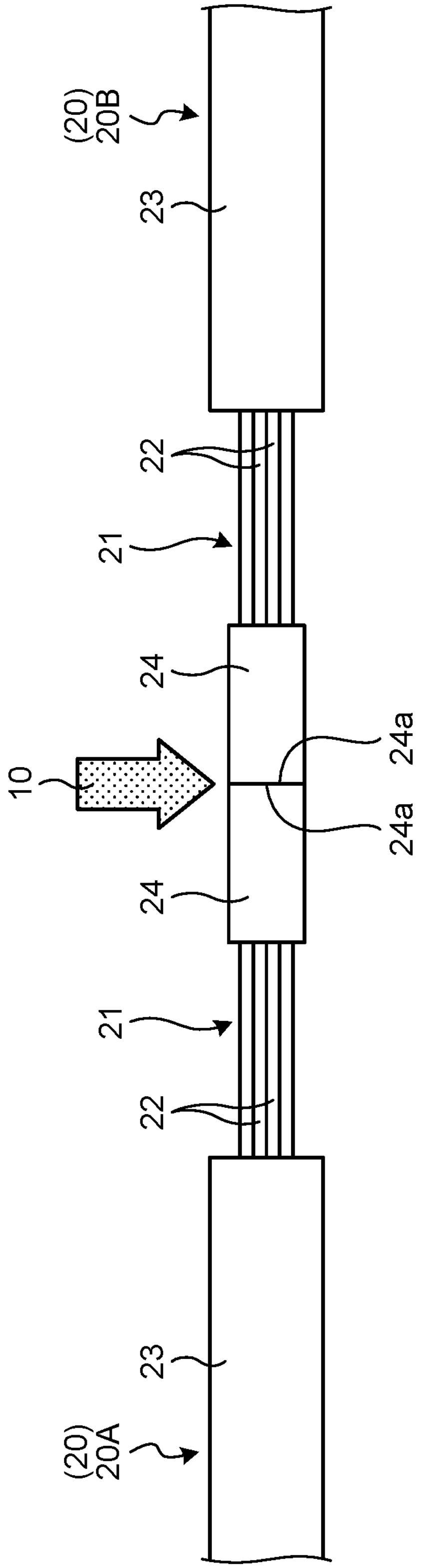
FIG. 15 is an explanatory diagram of a step of forming an electric wire assembly.
Figure 16:
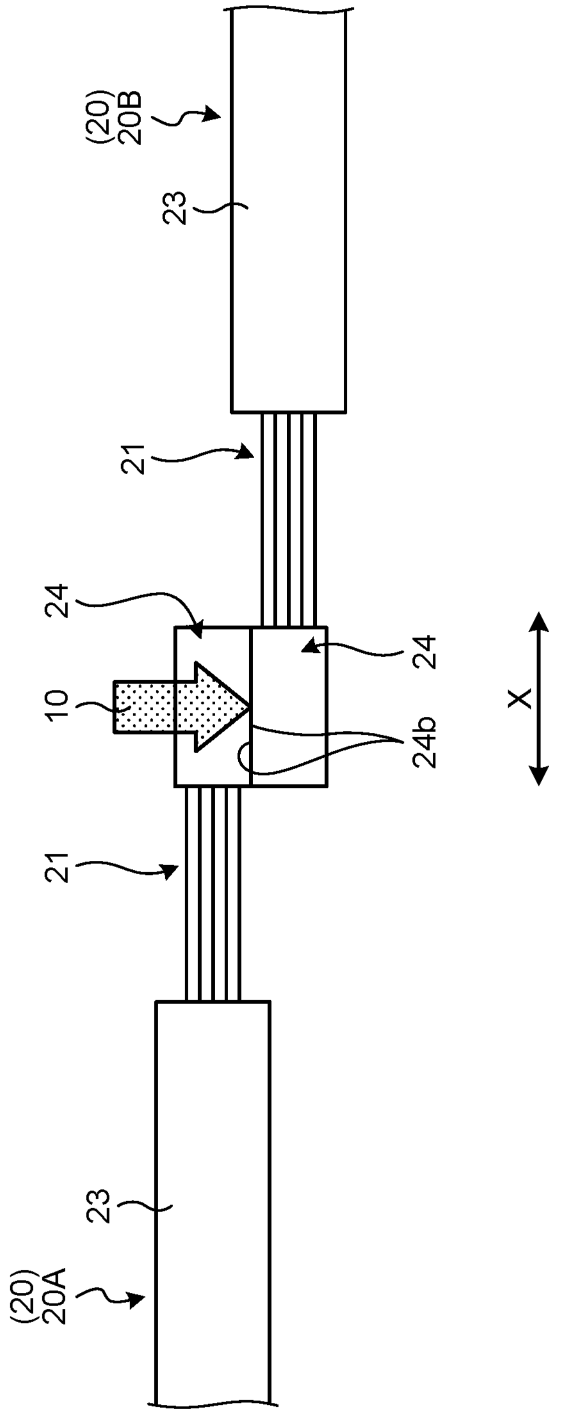
FIG. 16 is an explanatory diagram of a step of forming an electric wire assembly.
Figure 17:
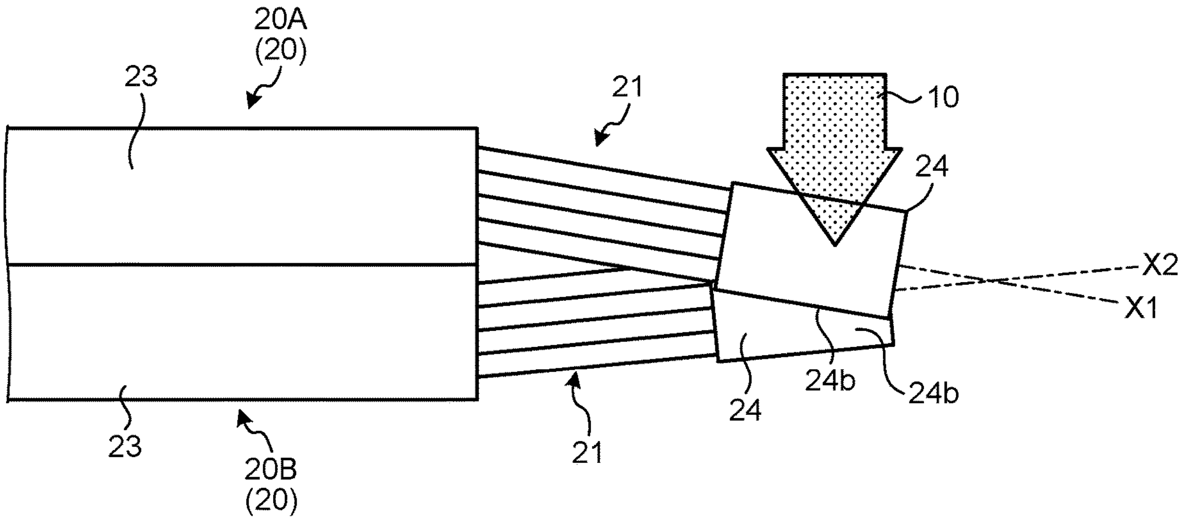
FIG. 17 is an explanatory diagram of a step of forming an electric wire assembly.

FIG. 11 is a perspective view illustrating the terminal caulked to an electric wire; FIG. 12 is a perspective view illustrating the terminal welded to the electric wire; FIG. 13 is a perspective view illustrating an example pressure-contact terminal; FIG. 14 is a perspective view illustrating the electric wire in pressure contact with the pressure-contact terminal; FIG. 15 is an explanatory diagram of a step of forming an electric wire assembly; FIG. 16 is an explanatory diagram of a step of forming an electric wire assembly; and FIG. 17 is an explanatory diagram of a step of forming an electric wire assembly. FIG. 8 illustrates a section taken along the line VIII-VIII in FIG. 7.

As illustrated in FIG. 1, the electric wire manufacturing apparatus 1 according to the present embodiment includes a emitting part 2, a holding mechanism 3, and a jig 4. As illustrated in FIG. 6 and the like, the electric wire manufacturing apparatus 1 is an apparatus that emits laser light 10 toward a core wire 21 of an electric wire 20. The emitted laser light 10 joins strands 22 of the core wire 21 to each other, thereby forming a joined portion 24.

The jig 4 is a tubular member and has a function to control formation of the joined portion 24. As illustrated in FIGS. 1 and 2, the exemplified jig 4 has a cylindrical shape. In the following description, the axial direction of the jig 4 is referred to as an “axial direction X”. When the laser light 10 is emitted toward the core wire 21, the strands 22 may be cut through melting in some cases. The electric wire manufacturing apparatus 1 of the present embodiment emits the laser light 10 while covering the core wire 21 with the jig 4, and can thus reduce scattering of the strands 22.

The exemplified jig 4 is a transparent member that can transmit the laser light 10. The jig 4 is made of a material the transmittance of the laser light 10 of which is equal to or greater than a predetermined value. The predetermined value is, for example, 90%. The laser light 10 emitted by the emitting part 2 has any desired wavelength as long as the strands 22 is melted therewith. The jig 4 is made of, for example, transparent quartz glass. Transparent quartz glass has a feature of having high light transmittance over all wavelengths including the ultraviolet and infrared ranges in comparison with other glasses (for example, silicate glasses). Quartz glass transmits most of the laser light 10 and hardly absorbs the laser light 10.

The jig 4 has a melting point higher than that of the core wire 21. The core wire 21 is made of, for example, conductive metal, such as copper and aluminum. Copper has a melting point of 1,085[° C.], and aluminum has a melting point of 660[° C.]. By contrast, quartz glass has a softening temperature of, for example, 1,600[° C.]. Thus, without melting the quartz glass, it is possible to melt the core wire 21. Furthermore, quartz glass is eroded by nothing except limited chemical agents, such as hydrofluoric acid, and is chemically stable.

Note that the jig 4 may be made of a material other than quartz glass. The material of the jig 4 is selected from, for example, materials the transmittance of which in the infrared and ultraviolet ranges is equal to or greater than the predetermined value and that have a melting point higher than that of the core wire 21. The jig 4 may be made of fluoride glass or chalcogenide glass.

The emitting part 2 generates and emits the laser light 10. The emitting part 2 generates the laser light 10 with, for example, a semiconductor laser. The laser light 10 emitted by the emitting part 2 is, for example, a laser beam. The emitting part 2 emits the laser light 10 toward the core wire 21 accommodated in the jig 4. The emitting part 2 is located on a line extending from the jig 4 in the axial direction X. The emitting part 2 is disposed in such a position that the optical axis of the laser light 10 is coaxial to the jig 4, for example.

The holding mechanism 3 is a mechanism that holds the core wire 21. As illustrated in FIG. 3, the exemplified holding mechanism 3 holds the core wire 21 via a sheath 23. The exemplified electric wire 20 includes the core wire 21 and the sheath 23. The sheath 23 covers the core wire 21 while exposing an end portion of the core wire 21. The sheath 23 is, for example, an insulating synthetic resin. The core wire 21 includes a plurality of the strands 22. The strands 22 have the same diameter, for example.

As illustrated in FIG. 1, the holding mechanism 3 includes a holding section 30 and a driving section 31. The holding section 30 is a part that holds the electric wire 20. The holding section 30 holds the core wire 21 by, for example, sandwiching the electric wire 20. The driving section 31 includes a mechanism to actuate the holding section 30. The driving section 31 includes a mechanism to sandwich the electric wire 20 by the holding section 30 and a mechanism to move the holding section 30. The driving section 31, for example, moves the holding section 30 in the axial direction X to allow the core wire 21 to be inserted into the jig 4 or to be pulled out from the jig 4.

In the electric wire manufacturing apparatus 1 of the present embodiment, the jig 4 extends in a vertical direction. The emitting part 2 emits the laser light 10 downward in the vertical direction. This configuration can form the joined portion 24 in such a manner that a gap between the core wire 21 and the jig 4 is filled with the joined portion 24, which will be described below. Thus, the electric wire manufacturing apparatus 1 according to the present embodiment can form the joined portion 24 in a wide region along the axial direction of the electric wire 20 and can improve electrical performance of the electric wire 20. Furthermore, the electric wire manufacturing apparatus 1 can control the shape of a solidifying melted substance of the core wire 21 with the jig 4.

The electric wire manufacturing method according to the present embodiment includes a placing step and a step of forming the joined portion. In the placing step, the core wire 21 of the electric wire 20 is placed inside the jig 4. As described with reference to FIGS. 3 to 5, the placing step is performed by the holding mechanism 3. The holding mechanism 3 holds the electric wire 20 with the holding section 30 and inserts the core wire 21 into the jig 4. As illustrated in FIGS. 3 and 4, the holding section 30 holds the electric wire 20 with a tip surface 21*b* of the core wire 21 facing upward. The holding mechanism 3 inserts the core wire 21 from below relative to the jig 4. The holding mechanism 3 stops the core wire 21 in the position illustrated in FIG. 4 and holds the core wire 21.

At the completion of the insertion, the tip surface 21*b* of the core wire 21 faces upward. Furthermore, the tip surface 21*b* is located below a first end surface 4*a* of the jig 4. The first end surface 4*a* is an end surface located above between two end surfaces 4*a* and 4*c* of the jig 4. A second end surface 4*c* is an end surface located below. The tip surface 21*b* of the core wire 21 is surrounded by an inner circumferential surface 4*b* of the jig 4. The inner circumferential surface 4*b* serves as an inner wall surface of the jig 4 and controls the shape of the joined portion 24 to be formed. The holding mechanism 3 stops the electric wire 20 with a base end portion 21*a* of the core wire 21 protruding from the jig 4. However, the base end portion 21*a* of the core wire 21 may be located inside the jig 4.

As illustrated in FIG. 5, a diameter D2 of the core wire 21 is smaller than an inside diameter D1 of the jig 4. The core wire 21 is placed while a gap 7 is made between an outer circumferential surface 21*c* of the core wire 21 and the inner circumferential surface 4*b* of the jig 4. The core wire 21 is held so that, for example, the gap 7 is made over the entire circumference of the outer circumferential surface 21*c*. The gap 7 may have a width G1 uniform along the circumferential direction. The holding mechanism 3 may hold the electric wire 20 with the outer circumferential surface 21*c* partially coming into contact with the inner circumferential surface 4*b* of the jig 4.

As illustrated in FIG. 6, in the step of forming the joined portion, the emitting part 2 emits the laser light 10 toward the tip surface 21*b* of the core wire 21. The laser light 10 melts the strands 22 of the core wire 21. The melted substance of the strands 22 flows into the gap 7 as illustrated with the arrows AR1. The melted substance of the strands 22 fills the gap 7 while flowing downward along the inner circumferential surface 4*b* of the jig 4. The melted substance also flows into gaps between the strands 22 and 22 and fills the gaps between the strands 22 and 22.

As illustrated in FIGS. 7 and 8, when the melted substance of the strands 22 solidifies, the joined portion 24 is formed. The joined portion 24 is a part where the strands 22 are joined to each other. The joined portion 24 has a shape corresponding to the shape of the inner circumferential surface 4*b* of the jig 4. When the jig 4 has a cylindrical shape, the joined portion 24 has a columnar shape. A diameter D3 of the joined portion 24 is greater than the diameter D2 of the core wire 21. The diameter D3 of the joined portion 24 is, for example, substantially the same as the inside diameter D1 of the jig 4.

As illustrated in FIG. 9, when the joining step is complete, the core wire 21 is taken out from the jig 4. The holding mechanism 3 moves the electric wire 20 downward to pull out the core wire 21 from the jig 4. The formed joined portion 24 extends in the axial direction of the core wire 21. By the electric wire manufacturing method according to the present embodiment, the joined portion 24 is formed while the melted substance of the strands 22 flows downward along the inner circumferential surface 4*b* of the jig 4. Thus, the joined portion 24 is formed in a wide range along the axial direction of the core wire 21. Furthermore, by filling the gap 7 with the melted substance, the joined portion 24 continuous in the circumferential direction is formed. The joined portion 24 may be formed with a length L3 greater than the diameter D3.

Furthermore, the laser light 10 is emitted toward the core wire 21 surrounded by the jig 4, so that the strands 22 are difficult to scatter. Moreover, the core wire 21 is surrounded by the jig 4, so that the shape of the joined portion 24 is difficult to vary. Thus, the electric wire manufacturing method according to the present embodiment can improve electrical performance of the electric wire 20 and can reduce variations in performance.

A terminal may be connected to the electric wire 20 in which the joined portion 24 is formed. A step of connecting a terminal to the joined portion 24 is referred to as a "connecting step". In the connecting step, for example, a terminal 5 illustrated in FIG. 10 is connected to the electric wire 20. The terminal 5 includes a terminal connector 50, a core wire connector 51, and a sheath connector 52. The terminal connector 50, the core wire connector 51, and the sheath connector 52 are formed from a conductive metal plate. The terminal connector 50 is a portion connected to a terminal to be mated. The core wire connector 51 is a portion connected to the core wire 21 of the electric wire 20. The core wire connector 51 includes a pair of crimping pieces 51*a* and 51*a*. The sheath connector 52 is a portion connected to the sheath 23 of the electric wire 20. The sheath connector 52 includes a pair of crimping pieces 52*a* and 52*a*.

FIG. 11 illustrates the terminal 5 connected to the electric wire 20. The crimping pieces 51*a* and 51*a* of the core wire connector 51 are caulked to the joined portion 24. In this case, the connecting step includes a step of caulking the crimping pieces 51*a* and 51*a* to the joined portion 24. The crimping pieces 51*a* and 51*a* are caulked and crimped to the joined portion 24, for example, in a manner of so-called B crimp. The core wire connector 51 is physically and electrically connected to the joined portion 24.

The crimping pieces 52*a* and 52*a* of the sheath connector 52 are caulked to the sheath 23. The crimping pieces 52*a* and 52*a* are caulked to the sheath 23 with tips of the crimping pieces 52*a* and 52*a* abutting each other, for example. The step of caulking the terminal 5 to the electric wire 20 is performed with, for example, a terminal crimping device including an anvil and a crimper. The terminal crimping device caulks the terminal 5 to the electric wire 20 to manufacture an electric wire 6 with a terminal.

The core wire connector 51 may be connected to the joined portion 24 by welding, such as laser welding. In this case, the connecting step includes a step of welding the crimping pieces 51*a* and 51*a* to the joined portion 24. When the core wire connector 51 is welded to the joined portion 24, the pair of crimping pieces 51*a* and 51*a* covers the joined portion 24 as illustrated in FIG. 12, for example. A gap may be defined between the crimping pieces 51*a* and 51*a*. Laser light is then emitted toward the crimping pieces 51*a* and 51*a* and the joined portion 24. The laser light melts the crimping pieces 51*a* and 51*a* and the joined portion 24, and the crimping pieces 51*a* and 51*a* are integrated with the joined portion 24. The crimping pieces 52*a* and 52*a* of the sheath connector 52 are caulked to the sheath 23.

The joined portion 24 may be brought into pressure contact with a terminal. In this case, the connecting step includes a step of bringing the joined portion 24 into pressure contact with a pressure-contact terminal. FIG. 13 illustrates a terminal 5 configured as a pressure-contact terminal. The terminal 5 includes a terminal connector 50, a core wire connector 51, and a sheath connector 52. The terminal connector 50 and the sheath connector 52 have configurations similar to those of the terminal connector 50 and the sheath connector 52 that have been described with reference to FIG. 10.

The core wire connector 51 illustrated in FIG. 13 includes a pair of side walls 53 and 53. The pair of side walls 53 and 53 face each other in the width direction of the terminal 5. The core wire connector 51 includes a pair of first pressure-contact blades 54 and 54 and a pair of second pressure-contact blades 55 and 55. The first pressure-contact blades 54 and the second pressure-contact blades 55 are formed by bending portions of the side walls 53. The first pressure-contact blades 54 and 54 have tips facing each other in the width direction of the terminal 5. The second pressure-contact blades 55 and 55 have tips facing each other in the width direction of the terminal 5.

As illustrated in FIG. 14, the joined portion 24 of the electric wire 20 is pressed into a gap between the pair of first pressure-contact blades 54 and 54 and a gap between the pair of second pressure-contact blades 55 and 55. The first pressure-contact blades 54 and 54 and the second pressure-contact blades 55 and 55 hold the joined portion 24 and are electrically connected to the joined portion 24. The crimping pieces 52*a* and 52*a* of the sheath connector 52 are caulked to the sheath 23.

As described with reference to FIGS. 15 to 17, the joined portion 24 may be joined to the joined portion 24 of another electric wire 20. By joining a plurality of the joined portions 24, an assembly of electric wires connected to each other is formed. In a step of forming an electric wire assembly, for example, the joined portion 24 formed in a first electric wire 20A is joined to the joined portion 24 formed in a second electric wire 20B as illustrated in FIG. 15. In this case, for example, tip surfaces 24*a* and 24*a* of the two joined portions 24 and 24 abut each other. With the tip surfaces 24*a* and 24*a* abutting each other, laser light 10 is emitted toward the tip portions of the joined portions 24. This laser light 10 may be emitted by the electric wire manufacturing apparatus 1 or other devices. The laser light 10 welds and integrates the two joined portions 24 and 24.

At the step of forming an electric wire assembly, side surfaces 24*b* and 24*b* of the two joined portions 24 and 24 may be welded as illustrated in FIG. 16. For example, the first electric wire 20A and the second electric wire 20B are connected linearly. In this case, the first electric wire 20A extends from the joined portion 24 toward one side in the axial direction X, and the second electric wire 20B extends from the joined portion 24 toward the other side in the axial direction X. In the step of forming an electric wire assembly, first, the side surface 24*b* of one of the joined portions 24 comes into contact with the side surface 24*b* of the other joined portion 24. With the side surfaces 24*b* and 24*b* of the two joined portions 24 and 24 coming into contact with each other, the laser light 10 is emitted toward the contact portion. This welds the two joined portions 24 and 24 at the side surfaces 24*b* and integrates the two joined portions 24 and 24.

As illustrated in FIG. 17, the two joined portions 24 and 24 may join while having their central axes X1 and X2 arranged askew with each other. For example, the first electric wire 20A is connected to the second electric wire 20B with the sheaths 23 parallel with each other. The joined portion 24 of the first electric wire 20A has the central axis X1. The joined portion 24 of the second electric wire 20B has the central axis X2. The two central axes X1 and X2 do not intersect with each other or are not parallel with each other. In the step of forming an electric wire assembly, the side surfaces 24*b* and 24*b* comes into contact with each other with the two joined portions 24 and 24 having such a positional relation, and the two joined portions 24 and 24 are welded with the laser light 10.

As described above, the electric wire manufacturing method according to the present embodiment includes the placing step and the step of forming the joined portion. In the placing step, the core wire 21 including the strands 22 is placed inside the tubular jig 4. In the step of forming the joined portion, the joined portion 24 is formed by emitting the laser light 10 along the axial direction of the core wire 21 toward the tip of the core wire 21 placed inside the jig 4 to integrate the strands 22.

In the placing step, the core wire 21 is placed with the gap 7 between the inner circumferential surface 4*b* of the jig 4 and the outer circumferential surface 21*c* of the core wire 21 while the tip of the core wire 21 faces upward relative to a horizontal line. In the step of forming the joined portion, the melted substance of the strands 22 fills the gap 7 to form the joined portion 24. The electric wire manufacturing method according to the present embodiment can control the shape of the solidifying melted core wire 21 with the jig 4.

In the placing step, the gap 7 may be made between the inner circumferential surface 4*b* of the jig 4 and the outer circumferential surface 21*c* of the core wire 21 over the entire circumference of the outer circumferential surface 21*c* of the core wire 21. In this case, in the step of forming the joined portion, the melted substance fills the gap 7 over the entire circumference of the outer circumferential surface 21*c*.

The electric wire manufacturing method may include the step of connecting the terminal 5 to the joined portion 24. In the step of connecting the terminal, the terminal 5 is crimped to the joined portion 24, or the joined portion 24 is brought into pressure contact with the terminal 5. The shape of the joined portion 24 is controlled, so that the terminal 5 and the joined portion 24 are readily connected to each other.

The electric wire manufacturing method may include the step of joining the joined portion 24 formed in the first electric wire 20A to the joined portion 24 formed in the second electric wire 20B. The shapes of the joined portions 24 are controlled, so that the step of joining the joined portions 24 and 24 are readily performed.

The electric wire manufacturing apparatus 1 according to the present embodiment includes the jig 4, the holding mechanism 3, and the emitting part 2. The jig 4 has a tubular shape and accommodates the core wire 21 including the strands 22 while the tip of the core wire 21 faces upward relative to a horizontal line. The holding mechanism 3 holds the core wire 21 providing the gap 7 between the inner circumferential surface 4*b* of the jig 4 and the outer circumferential surface 21*c* of the core wire 21. The emitting part 2 emits the laser light 10 along the axial direction of the core wire 21 toward the tip of the core wire 21 placed inside the jig 4 to form the joined portion 24 by filling the gap 7 with the melted substance of the strands 22. The electric wire manufacturing apparatus 1 according to the present embodiment can control the shape of the solidifying melted core wire 21 with the jig 4.

Note that the electric wire 20 is not limited to having the sheath 23. In the step of forming the assembly of the electric wires 20, three or more joined portions 24 may be welded to each other. In this case, the three or more joined portions 24 may be integrated through a single welding process or a plurality of welding processes.

First Modification of Embodiment

Figure 18:
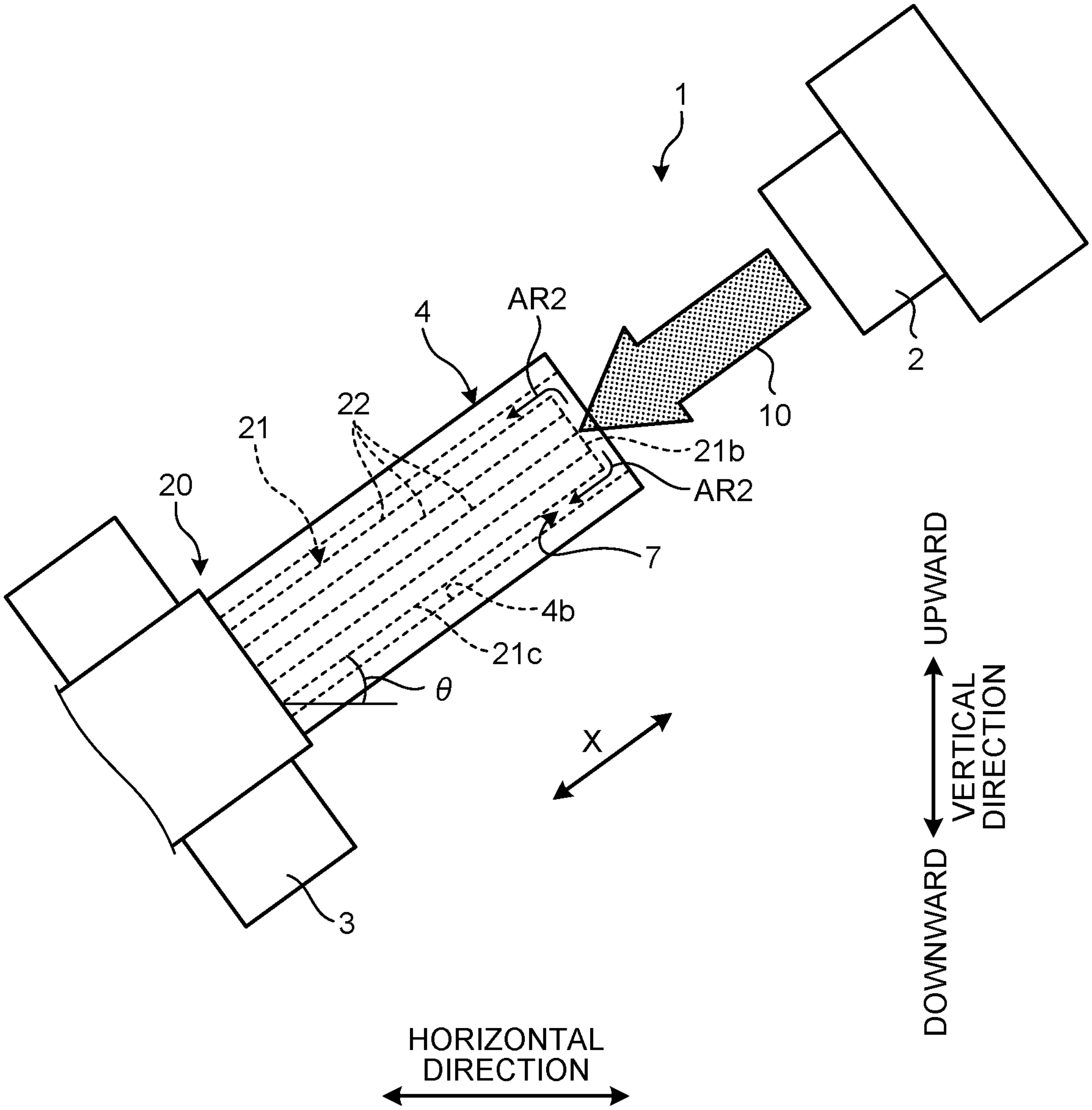
FIG. 18 is a diagram illustrating a joining step with an electric wire manufacturing apparatus according to a first modification of the embodiment.
Figure 19:
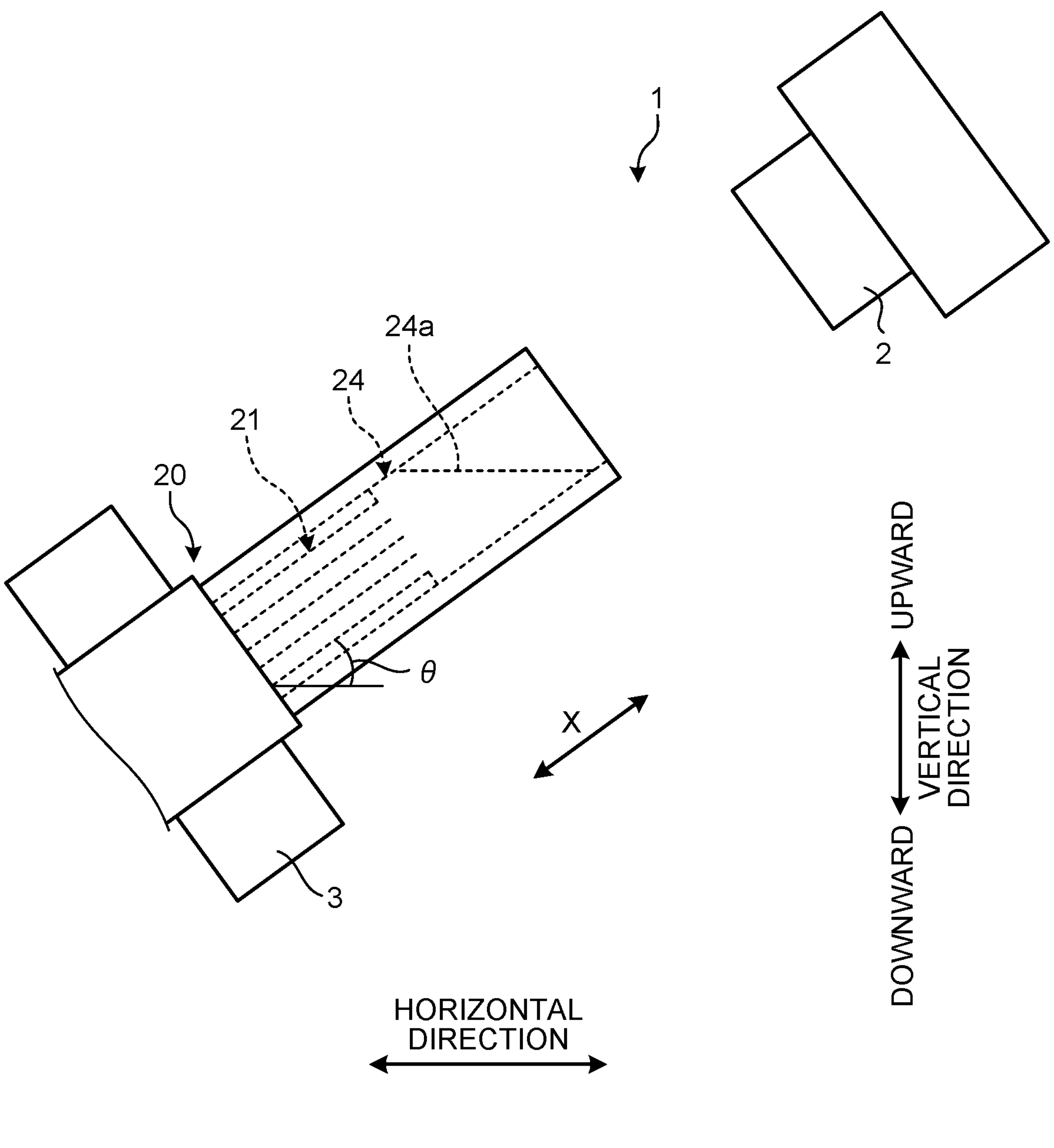
FIG. 19 is a diagram illustrating a joined portion formed in the first modification of the embodiment.
Figure 20:
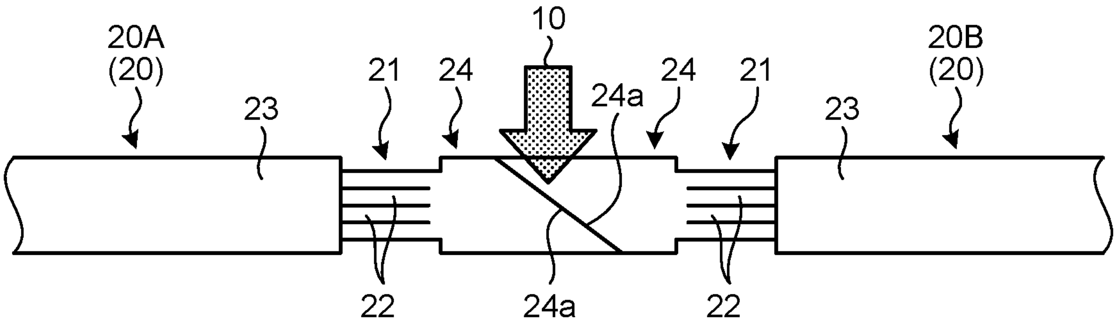
FIG. 20 is a diagram illustrating a step of forming an electric wire assembly according to the first modification of the embodiment.

A first modification of the embodiment will be described. FIG. 18 is a diagram illustrating a joining step with an electric wire manufacturing apparatus according to the first modification of the embodiment; FIG. 19 is a diagram illustrating a joined portion formed in the first modification of the embodiment; and FIG. 20 is a diagram illustrating a step of forming an electric wire assembly according to the first modification of the embodiment. The first modification of the embodiment differs from the above-described embodiment in that, for example, the core wire 21 is inclined relative to the vertical direction in the joining step.

As illustrated in FIG. 18, the electric wire manufacturing apparatus 1 according to the first modification of the embodiment inclines the jig 4 at least in the joining step. In the electric wire manufacturing apparatus 1, the jig 4 may be always inclined and may have a variable inclination angle θ. The inclination angle θ of the axial direction X to the horizontal direction is greater than 0° and less than 90°. The inclination angle θ may be, for example, 30°. The holding mechanism 3 inserts the core wire 21 into the jig 4 and places the core wire inside the jig 4. The core wire 21 is held with the tip surface 21*b* facing upward relative to a horizontal line. The core wire 21 preferably has the same inclination angle as the inclination angle θ of the jig 4. The emitting part 2 emits laser light 10 in the axial direction X. The laser light 10 is emitted toward the tip surface 21*b* of the core wire 21 and melts the strands 22.

A melted substance of the strands 22 fills a gap 7 between the core wire 21 and the jig 4 as illustrated with the arrows AR2. The melted substance of the strands 22 also flows into gaps between the strands 22 and 22 and joins the strands 22 and 22. As illustrated in FIG. 19, the joined portion 24 has a tip surface 24*a* that is an inclined surface corresponding to the inclination angle θ. The tip surface 24*a* is inclined relative to the axial direction X and is, for example, a horizontal surface. With the electric wire manufacturing method and manufacturing apparatus 1 according to the first modification of the embodiment, the tip surface 24*a* having a large area can be formed.

When the two joined portions 24 and 24 are joined, for example, the tip surfaces 24*a* and 24*a* abut each other as illustrated in FIG. 20. For example, the tip surfaces 24*a* and 24*a* abut each other with the first electric wire 20A and the second electric wire 20B extending linearly. With the tip surfaces 24*a* and 24*a* abutting each other, the laser light 10 is emitted toward the tip portions of the joined portions 24. The tip surface 24*a* having a large area increases a joining area, enabling firm joining.

Second Modification of Embodiment

Figure 21:
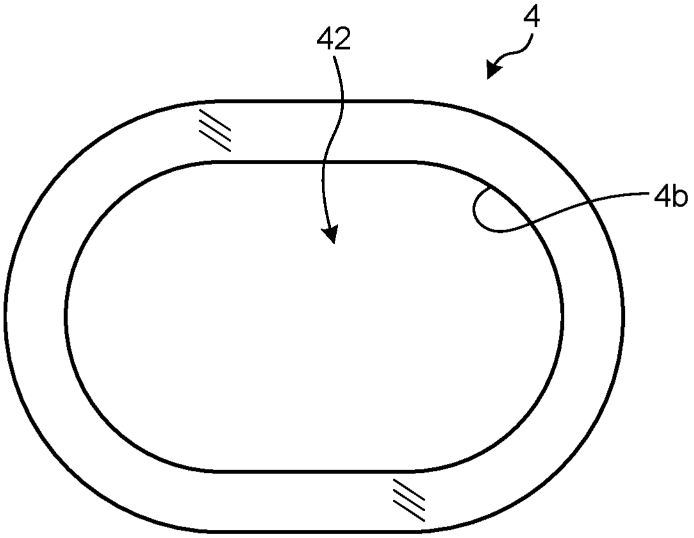
FIG. 21 is a front view of a jig according to a second modification of the embodiment.
Figure 22:
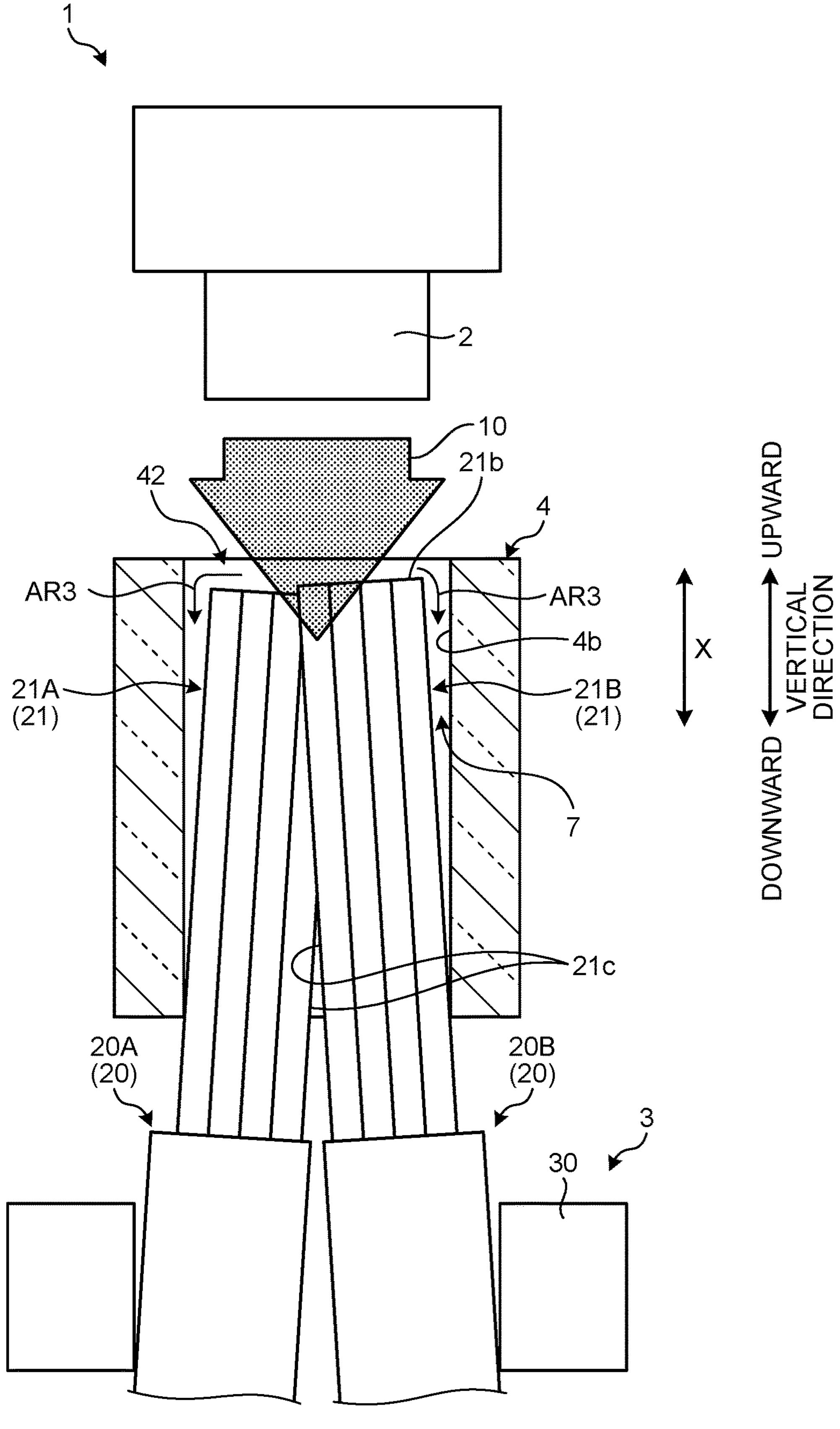
FIG. 22 is an explanatory diagram of a joining step according to the second modification of the embodiment.
Figure 23:
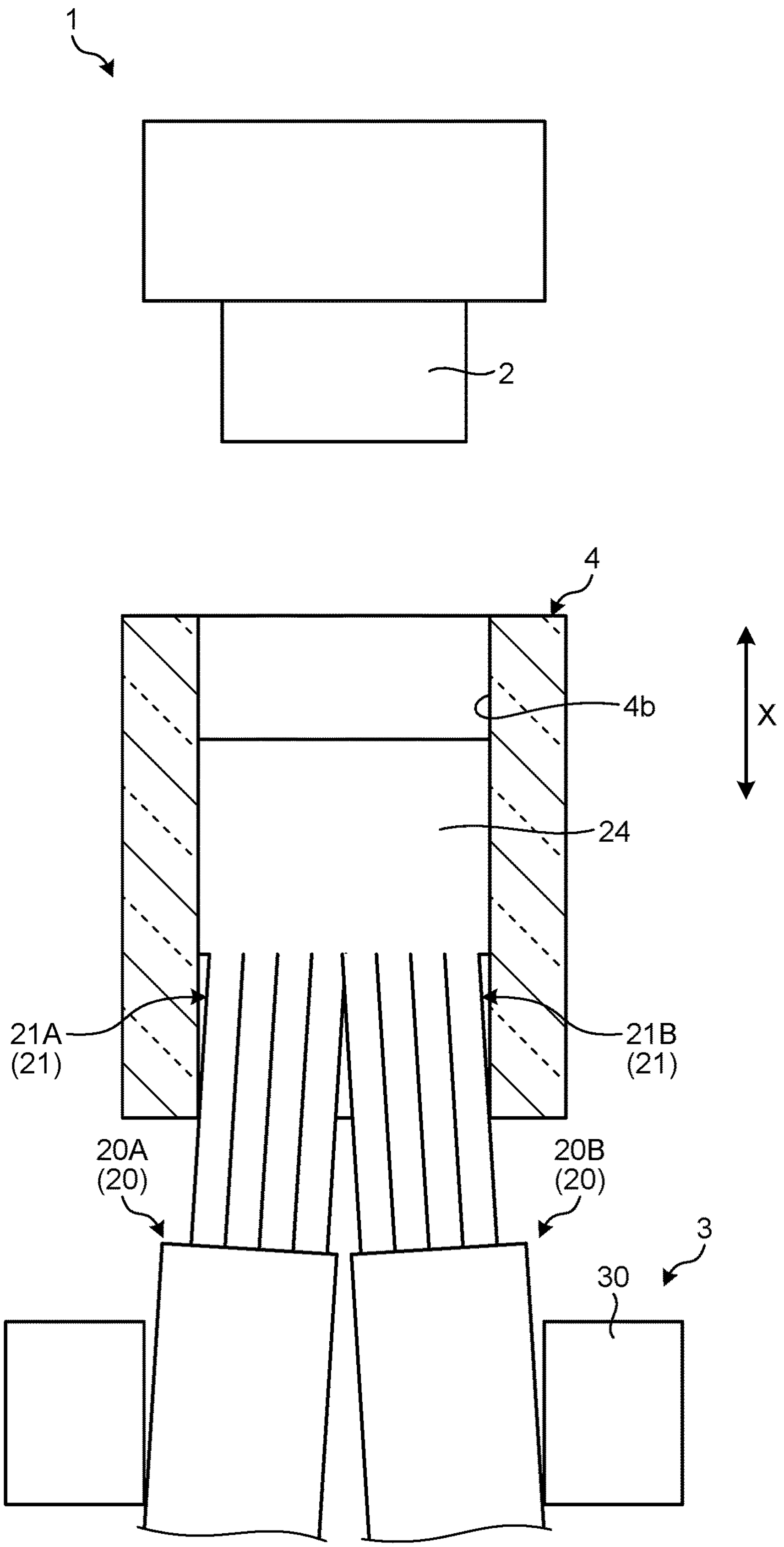
FIG. 23 is a diagram illustrating a joined portion formed in the second modification of the embodiment.
Figure 24:
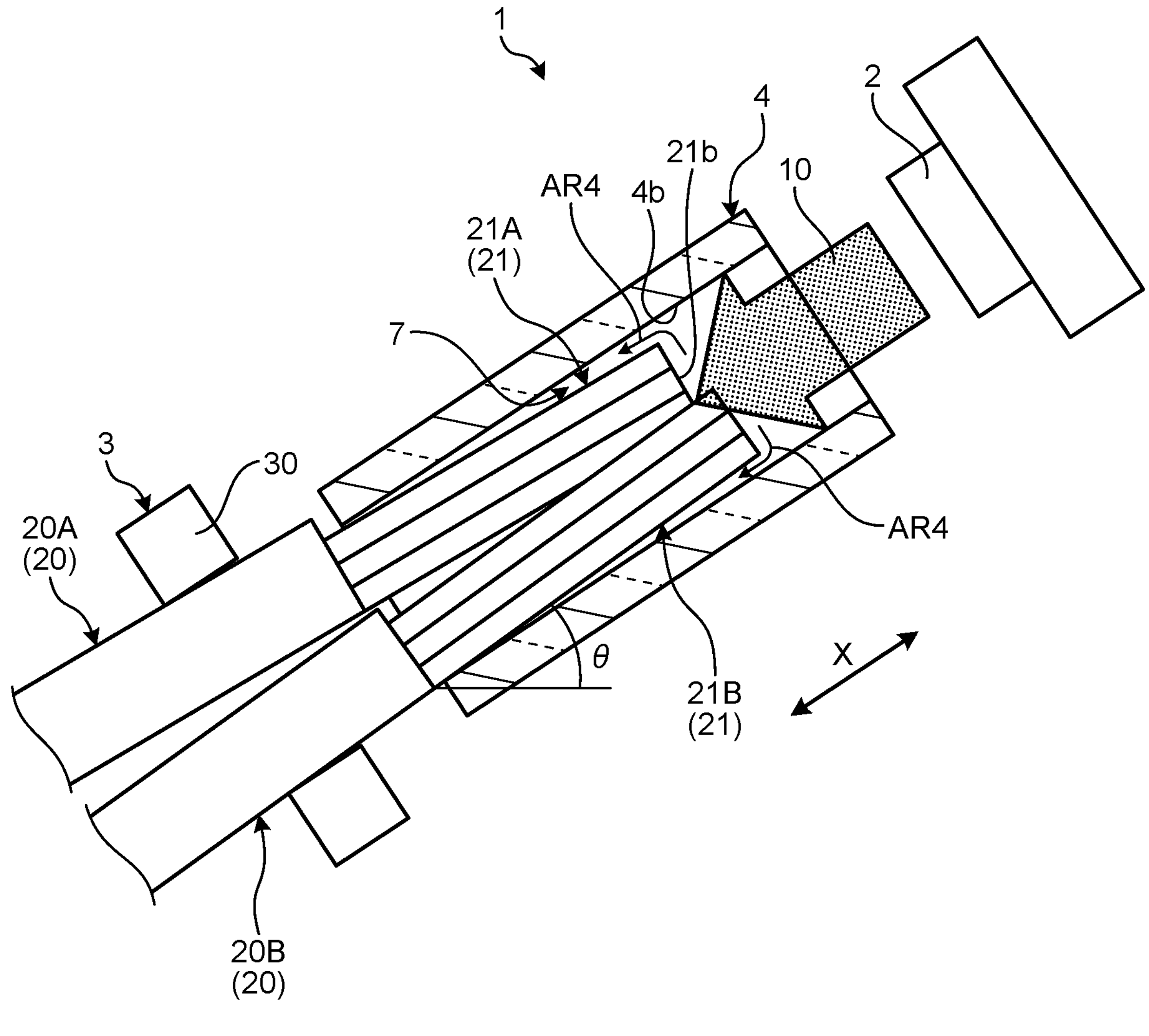
FIG. 24 is an explanatory diagram of another joining step according to the second modification of the embodiment.
Figure 25:
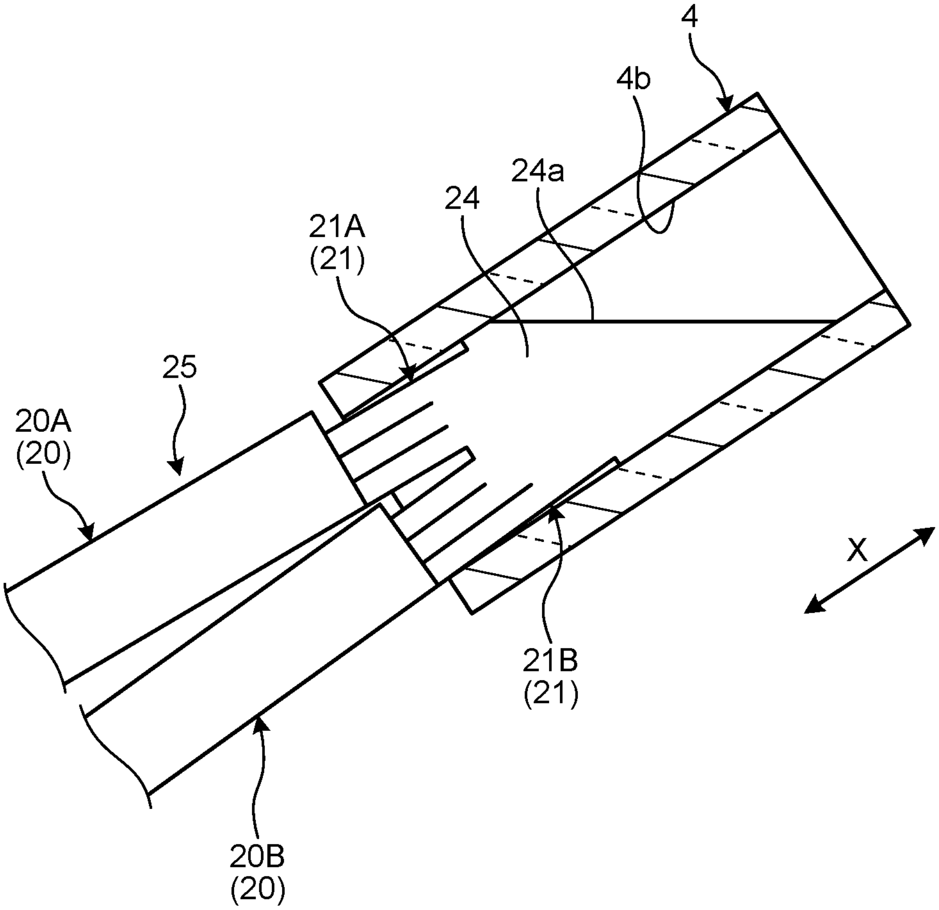
FIG. 25 is a diagram illustrating another joined portion formed in the second modification of the embodiment.
Figure 26:
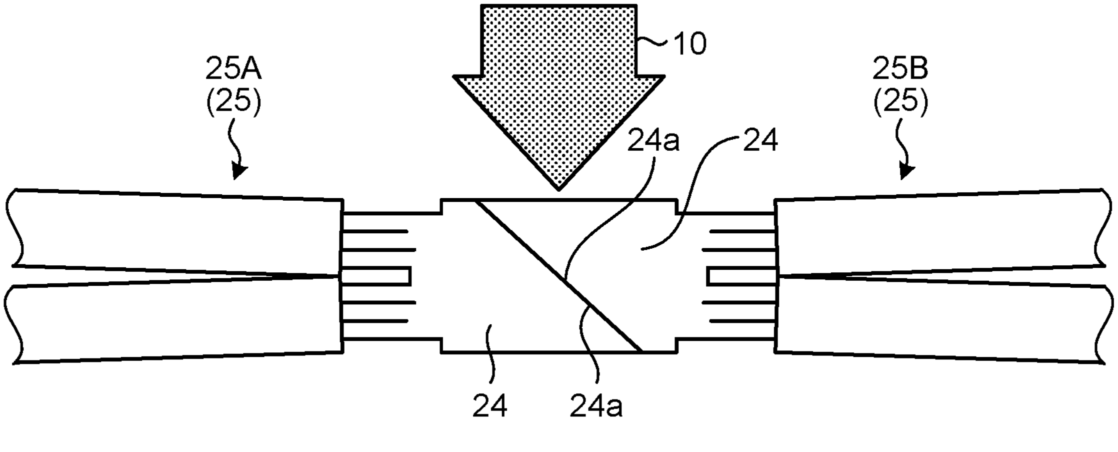
FIG. 26 is a diagram illustrating a step of joining electric wire assemblies to each other.

A second modification of the embodiment will be described. FIG. 21 is a front view of a jig according to the second modification of the embodiment; FIG. 22 is an explanatory diagram of a joining step according to the second modification of the embodiment; FIG. 23 is a diagram illustrating a joined portion formed in the second modification of the embodiment; FIG. 24 is an explanatory diagram of another joining step according to the second modification of the embodiment; FIG. 25 is a diagram illustrating another joined portion formed in the second modification of the embodiment; and FIG. 26 is a diagram illustrating a step of joining electric wire assemblies to each other.

As illustrated in FIG. 21, the jig 4 according to the second modification of the embodiment includes an accommodating space 42 capable of accommodating a plurality of the core wires 21. The accommodating space 42 has a substantially oval cross section orthogonal to the axial direction X.

As illustrated in FIG. 22, the core wires 21 are placed inside the jig 4. The exemplified jig 4 extends in the vertical direction. For example, two core wires 21 are placed inside the jig 4. One of the core wires 21 is a first core wire 21A of a first electric wire 20A. The other core wire 21 is a second core wire 21B of a second electric wire 20B. The first core wire 21A and the second core wire 21B are placed side by side with outer circumferential surfaces 21*c* thereof coming into contact with each other, for example.

The emitting part 2 emits laser light 10 toward tip surfaces 21*b* of the core wires 21A and 21B in the vertical direction. The laser light 10 melts strands 22 of the first core wire 21A and the second core wire 21B. A melted substance of the strands 22 flows into a gap 7 between the core wires 21A and 21B and the jig 4 as illustrated with the arrows AR3. The melted substance of the strands 22 fills the gap 7 while flowing downward along an inner circumferential surface 4*b* of the jig 4. The melted substance also flows into gaps between the strands 22 and 22 and fills the gaps between the strands 22 and 22. As a result, as illustrated in FIG. 23, a joined portion 24 in which the first core wire 21A and the second core wire 21B are integrated is formed.

The joined portion 24 is formed in such a manner as to block the inside of the jig 4. The formed joined portion 24 has a shape corresponding to the shape of the inner circumferential surface 4*b* of the jig 4. The exemplified jig 4 forms the joined portion 24 having an oval cross section.

At the step of joining the core wires 21, the jig 4 may be inclined as illustrated in FIG. 24. The inclination angle θ of the axial direction X to the horizontal direction is greater than 0° and less than 90°. The inclination angle θ may be, for example, 30°. The holding mechanism 3 holds the core wires 21 at the inclination angle θ. The emitting part 2 emits laser light 10 in the axial direction X. The laser light 10 is emitted toward the tip surfaces 21*b* of the core wires 21A and 21B and melts the strands 22.

A melted substance of the strands 22 fills a gap 7 between the core wires 21 and the jig 4 as illustrated with the arrows AR4. The melted substance of the strands 22 also flows into gaps between the strands 22 and 22 and joins the first core wire 21A and the second core wire 21B. As illustrated in FIG. 25, a joined portion 24 in which the first core wire 21A and the second core wire 21B are integrated is formed. The first electric wire 20A and the second electric wire 20B are connected to each other at the joined portion 24, thereby forming an electric wire assembly 25. The joined portion 24 has a tip surface 24*a* that is an inclined surface corresponding to the inclination angle θ. The tip surface 24*a* is inclined relative to the axial direction X and is, for example, a horizontal surface.

The formed electric wire assembly 25 may be joined to another electric wire assembly 25. For example, as illustrated in FIG. 26, a first electric wire assembly 25A is joined to a second electric wire assembly 25B. In this case, for example, the tip surfaces 24*a* and 24*a* of the two joined portions 24 and 24 abut each other. With the tip surfaces 24*a* and 24*a* abutting each other, laser light 10 is emitted toward the tip portions of the joined portions 24. The laser light 10 welds and integrates the two joined portions 24 and 24, and the first electric wire assembly 25A is connected to the second electric wire assembly 25B.

As described above, in the electric wire manufacturing method according to the second modification of the embodiment, in the placing step, the core wires 21 are placed inside the jig 4, and the gap 7 is made between the outer circumferential surface 21*c* of each of the core wires 21A and 21B and the inner circumferential surface 4*b* of the jig 4. In the step of forming the joined portion, the laser light 10 is emitted toward the tips of the core wires 21A and 21B to form the joined portion 24 in which the core wires 21A and 21B are integrated. Thus, the shape of the joined portion 24 in which the core wires 21A and 21B are integrated is controlled.

Third Modification of Embodiment

Figure 27:
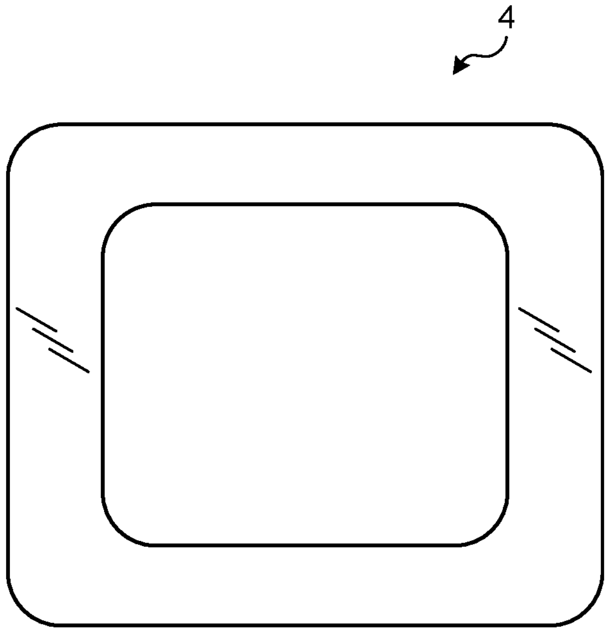
FIG. 27 is a front view of a jig according to a third modification of the embodiment.
Figure 28:
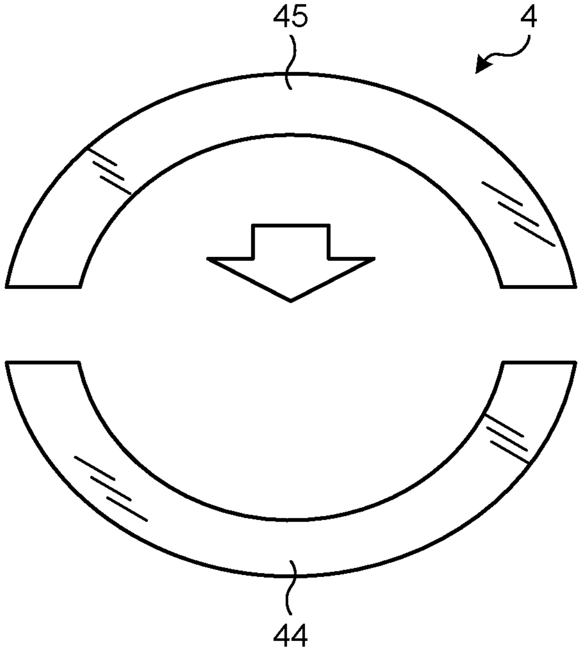
FIG. 28 is a front view of a jig according to the third modification of the embodiment.

A third modification of the embodiment will be described. FIGS. 27 and 28 are front views of jigs according to the third modification of the embodiment. The shape of the jig 4 is not limited to the shapes exemplified in the above-described embodiment and modifications. The jig 4 may be shaped into, for example, a square tube as illustrated in FIG. 27. The jig 4 illustrated in FIG. 27 can form a joined portion 24 shaped into a square column.

As illustrated in FIG. 28, the jig 4 may be split. The jig 4 illustrated in FIG. 28 includes a first member 44 and a second member 45. The first member 44 and the second member 45 are both shaped into a half tube. The exemplified first member 44 and second member 45 have a semicircular cross section. Thus, by combining the first member 44 and the second member 45, the jig 4 having a cylindrical shape is constituted.

When the jig 4 illustrated in FIG. 28 is used, in the step of placing the core wire 21, the first member 44 and the second member 45 sandwich the core wire 21. For example, the core wire 21 is placed on the first member 44, and then the second member 45 is combined with the first member 44. The core wire 21 is accommodated in an accommodating space 42 defined by the first member 44 and the second member 45.

The jig 4 may be made of a material that does not transmit the laser light 10 or a material that does not have a high transmittance of the laser light 10.

The content disclosed in the above-described embodiment and modifications may be appropriately combined and implemented.

In the electric wire manufacturing method according to the embodiment, in the step of forming the joined portion, the melted substance of the strands fills the gap between the inner wall surface of the jig and the outer circumferential surface of the core wire to form the joined portion. The electric wire manufacturing method according to the embodiment achieves the effect of controlling the shape of the solidifying melted core wire.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire manufacturing method comprising:
- placing a core wire inside a jig having a tubular shape defining a hollow tubular space, the core wire including a plurality of strands and including a distal tip face that remains located within the hollow tubular space of the jig;
- forming a joined portion that integrates the strands by emitting laser light toward a tip of the core wire placed inside the jig, the laser light being emitted in an axial direction of the core wire, wherein
- in the placing, the core wire is placed with a gap between an inner wall surface of the jig and an outer circumferential surface of the core wire while the tip of the core wire faces upward relative to a horizontal line, the gap extending along an entire length of the inner wall surface of the jig, and
- in the forming the joined portion, the joined portion is formed by filling the gap with a melted substance of the strands; and
- removing the core wire with the formed joined portion form the jig.

2. The electric wire manufacturing method according to claim 1, wherein
- in the placing, the gap is made between the inner wall surface of the jig and the outer circumferential surface of the core wire over an entire circumference of the outer circumferential surface of the core wire.

3. The electric wire manufacturing method according to claim 1, wherein
- in the placing, a plurality of the core wires are placed inside the jig and the gap is made between the outer circumferential surface of each of the core wires and the inner wall surface of the jig, and
- in the forming the joined portion, the joined portion that integrates the core wires is formed by emitting laser light toward tips of the core wires.

4. The electric wire manufacturing method according to claim 2, wherein
- in the placing, a plurality of the core wires are placed inside the jig and the gap is made between the outer circumferential surface of each of the core wires and the inner wall surface of the jig, and in the forming the joined portion, the joined portion that integrates the core wires is formed by emitting laser light toward tips of the core wires.

5. The electric wire manufacturing method according to claim 1, further comprising:

connecting a terminal to the joined portion, wherein in the connecting the terminal, the terminal is crimped to the joined portion or the joined portion is brought into pressure contact with the terminal.

6. The electric wire manufacturing method according to claim 2, further comprising:

connecting a terminal to the joined portion, wherein in the connecting the terminal, the terminal is crimped to the joined portion or the joined portion is brought into pressure contact with the terminal.

7. The electric wire manufacturing method according to claim 1, further comprising:

joining the joined portion formed in a first electric wire and the joined portion formed in a second electric wire together.

8. The electric wire manufacturing method according to claim 2, further comprising:

joining the joined portion formed in a first electric wire and the joined portion formed in a second electric wire together.

9. The electric wire manufacturing method according to claim 1, wherein the placing and the forming the joined portion use the jig that is transparent and configured to transmit the laser light.

10. The electric wire manufacturing method according to claim 2, wherein the placing and the forming the joined portion use the jig that is transparent and configured to transmit the laser light.

11. The electric wire manufacturing method according to claim 3, wherein the placing and the forming the joined portion use the jig that is transparent and configured to transmit the laser light.

12. The electric wire manufacturing method according to claim 4, wherein the placing and the forming the joined portion use the jig that is transparent and configured to transmit the laser light.

13. The electric wire manufacturing method according to claim 5, wherein the placing and the forming the joined portion use the jig that is transparent and configured to transmit the laser light.

14. The electric wire manufacturing method according to claim 6, wherein the placing and the forming the joined portion use the jig that is transparent and configured to transmit the laser light.

15. The electric wire manufacturing method according to claim 7, wherein the placing and the forming the joined portion use the jig that is transparent and configured to transmit the laser light.

16. The electric wire manufacturing method according to claim 8, wherein the placing and the forming the joined portion use the jig that is transparent and configured to transmit the laser light.

* * * * *